US012682250B2

(12) United States Patent
Zhang et al.

(10) Patent No.: US 12,682,250 B2
(45) Date of Patent: Jul. 14, 2026

(54) METHOD, DEVICE, AND APPARATUS FOR VERIFYING VERACITY OF STATEMENT, AND MEDIUM

(71) Applicants: Beijing Youzhuju Network Technology Co., Ltd., Beijing (CN); Fudan University, Shanghai (CN)

(72) Inventors: Xinbo Zhang, Beijing (CN); Jiangjie Chen, Beijing (CN); Qiaoben Bao, Beijing (CN); Changzhi Sun, Beijing (CN); Jiaze Chen, Beijing (CN); Hao Zhou, Beijing (CN); Yanghua Xiao, Beijing (CN); Lei Li, Beijing (CN)

(73) Assignees: Beijing Youzhuju Network Technology Co., Ltd., Beijing (CN); Fudan University, Shanghai (CN)

( * ) Notice: Subject to any disclaimer, the term of this patent is extended or adjusted under 35 U.S.C. 154(b) by 271 days.

(21) Appl. No.: 18/572,759

(22) PCT Filed: Nov. 16, 2022

(86) PCT No.: PCT/CN2022/132139
§ 371 (c)(1),
(2) Date: Dec. 20, 2023

(87) PCT Pub. No.: WO2023/088278
PCT Pub. Date: May 25, 2023

(65) Prior Publication Data
US 2024/0296339 A1     Sep. 5, 2024

(30) Foreign Application Priority Data
Nov. 16, 2021     (CN) .......................... 202111356625.8

(51) Int. Cl.
G06N 3/096          (2023.01)
G06F 40/166          (2020.01)
(Continued)

(52) U.S. Cl.
CPC ........... *G06N 3/096* (2023.01); *G06F 40/253* (2020.01); *G06F 40/289* (2020.01); *G06N 3/045* (2023.01); *G06F 40/166* (2020.01)

(58) Field of Classification Search
CPC ........ G06N 3/096; G06N 3/045; G06N 20/00; G06N 3/08; G06F 40/253; G06F 40/289; G06F 40/166; G06F 40/30
See application file for complete search history.

(56) References Cited

U.S. PATENT DOCUMENTS

| 2016/0078018 A1 | 3/2016 | Byron et al. |
| 2018/0173694 A1 | 6/2018 | Liu et al. |
| 2022/0171935 A1* | 6/2022 | Goyal ................... G06F 40/295 |

FOREIGN PATENT DOCUMENTS

| CN | 109635110 A | 4/2019 |
| CN | 110516697 A | 11/2019 |

(Continued)

OTHER PUBLICATIONS

International Patent Application No. PCT/CN2022/132139; Int'l Search Report; dated Feb. 7, 2023; 2 pages.

*Primary Examiner* — Linda Wong
(74) *Attorney, Agent, or Firm* — BakerHostetler

(57) ABSTRACT

Implementations of the present disclosure provide a method, a device, and an apparatus for verifying a veracity of a statement, and a medium. In One method, includes: training data including a statement, an evidence set, and a label are acquired. The statement is divided into a plurality of phrases based on a grammatical analysis of the statement. A phrase verification model is trained based on the training data and the plurality of phrases, so that the phrase verification model determines a plurality of phrase veracities of the plurality of phrases respectively based on the evidence set. A statement verification model is trained based on the training data and the plurality of phrases, so that the statement verification (Continued)

model determines a statement veracity of the statement based on the evidence set, where the plurality of phrase veracities provide an interpretation for the statement veracity.

20 Claims, 12 Drawing Sheets

(51)  Int. Cl.
    G06F 40/253       (2020.01)
    G06F 40/289       (2020.01)
    G06N 3/045        (2023.01)

(56)              References Cited

FOREIGN PATENT DOCUMENTS

| CN | 112069321 | A | 12/2020 |
|----|-----------|---|---------|
| CN | 112100351 | A | 12/2020 |
| CN | 112163574 | A | 1/2021 |
| CN | 112396185 | A | 2/2021 |
| CN | 114065741 | A | 2/2022 |

* cited by examiner

400

410

Training data (supported)

412 Statement

THE 2020 OLYMPICS
WAS HELD IN 2021.

414 Evidence set

...

416 Label

è Supportedê

110

Training
data set

330

MRC module

420

MRC model

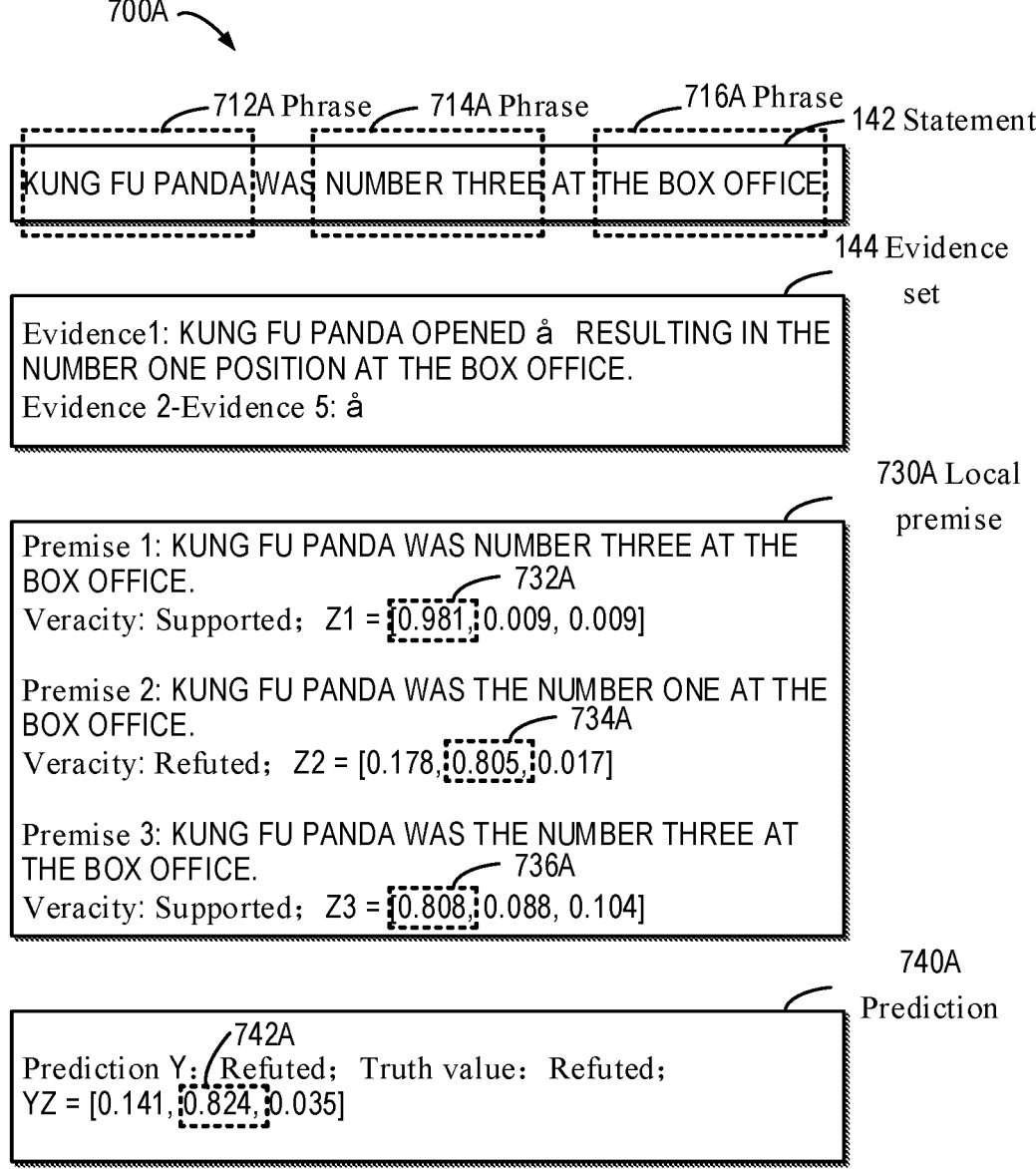

700A

712A Phrase   714A Phrase   716A Phrase   142 Statement

KUNG FU PANDA WAS NUMBER THREE AT THE BOX OFFICE

144 Evidence set

Evidence1: KUNG FU PANDA OPENED å RESULTING IN THE NUMBER ONE POSITION AT THE BOX OFFICE.
Evidence 2-Evidence 5: å

730A Local premise

Premise 1: KUNG FU PANDA WAS NUMBER THREE AT THE BOX OFFICE.                732A
Veracity: Supported; Z1 = [0.981, 0.009, 0.009]

Premise 2: KUNG FU PANDA WAS THE NUMBER ONE AT THE BOX OFFICE.                734A
Veracity: Refuted; Z2 = [0.178, 0.805, 0.017]

Premise 3: KUNG FU PANDA WAS THE NUMBER THREE AT THE BOX OFFICE.                736A
Veracity: Supported; Z3 = [0.808, 0.088, 0.104]

740A Prediction

742A
Prediction Y: Refuted; Truth value: Refuted;
YZ = [0.141, 0.824, 0.035]

FIG. 7A

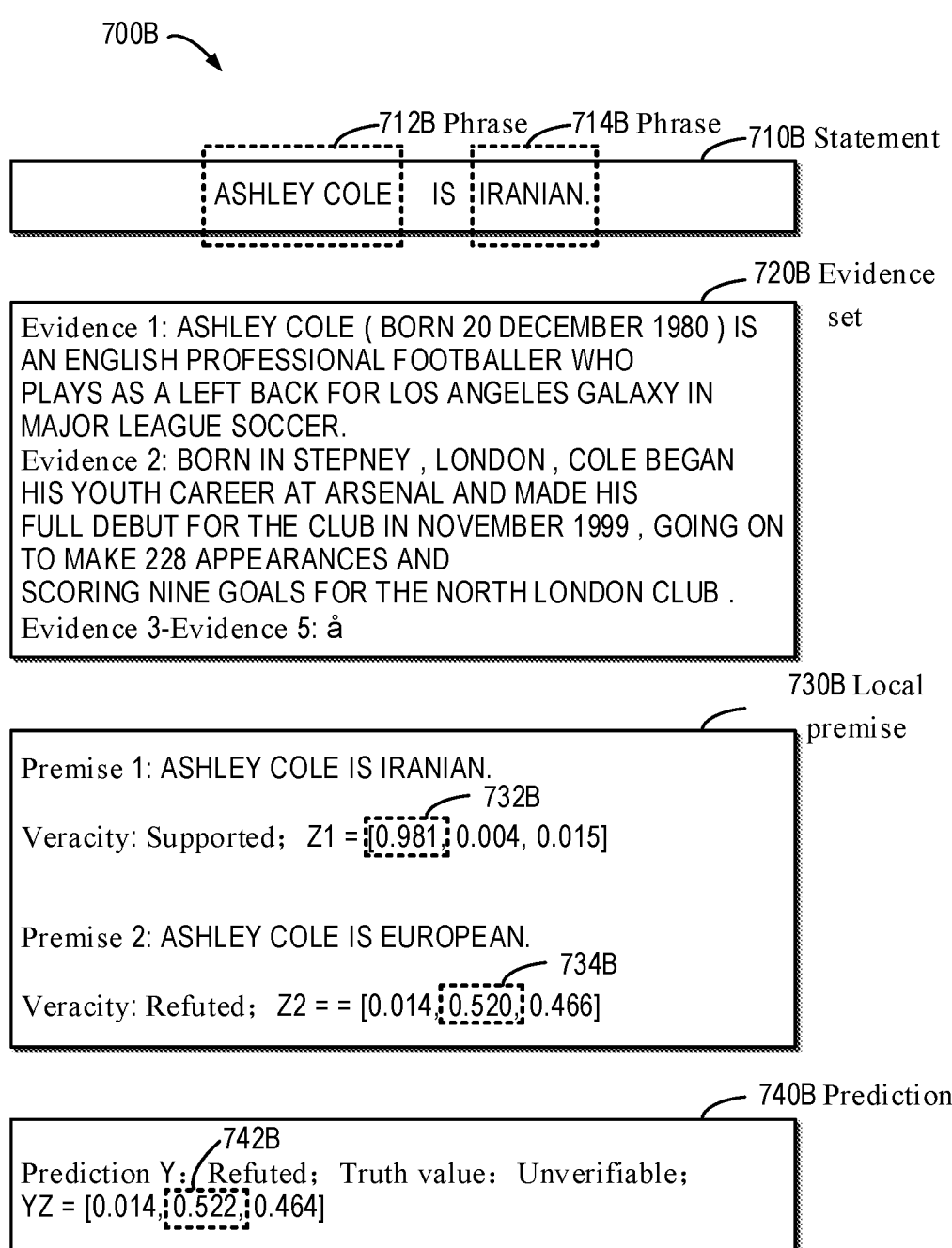

700B

712B Phrase   714B Phrase   710B Statement

ASHLEY COLE   IS   IRANIAN.

720B Evidence set

Evidence 1: ASHLEY COLE ( BORN 20 DECEMBER 1980 ) IS
AN ENGLISH PROFESSIONAL FOOTBALLER WHO
PLAYS AS A LEFT BACK FOR LOS ANGELES GALAXY IN
MAJOR LEAGUE SOCCER.
Evidence 2: BORN IN STEPNEY , LONDON , COLE BEGAN
HIS YOUTH CAREER AT ARSENAL AND MADE HIS
FULL DEBUT FOR THE CLUB IN NOVEMBER 1999 , GOING ON
TO MAKE 228 APPEARANCES AND
SCORING NINE GOALS FOR THE NORTH LONDON CLUB .
Evidence 3-Evidence 5: å

730B Local premise

Premise 1: ASHLEY COLE IS IRANIAN.

732B

Veracity: Supported;   $Z1 = [0.981, 0.004, 0.015]$

Premise 2: ASHLEY COLE IS EUROPEAN.

734B

Veracity: Refuted;   $Z2 = = [0.014, 0.520, 0.466]$

740B Prediction

742B
Prediction Y: Refuted;   Truth value: Unverifiable;
$YZ = [0.014, 0.522, 0.464]$

FIG. 7B

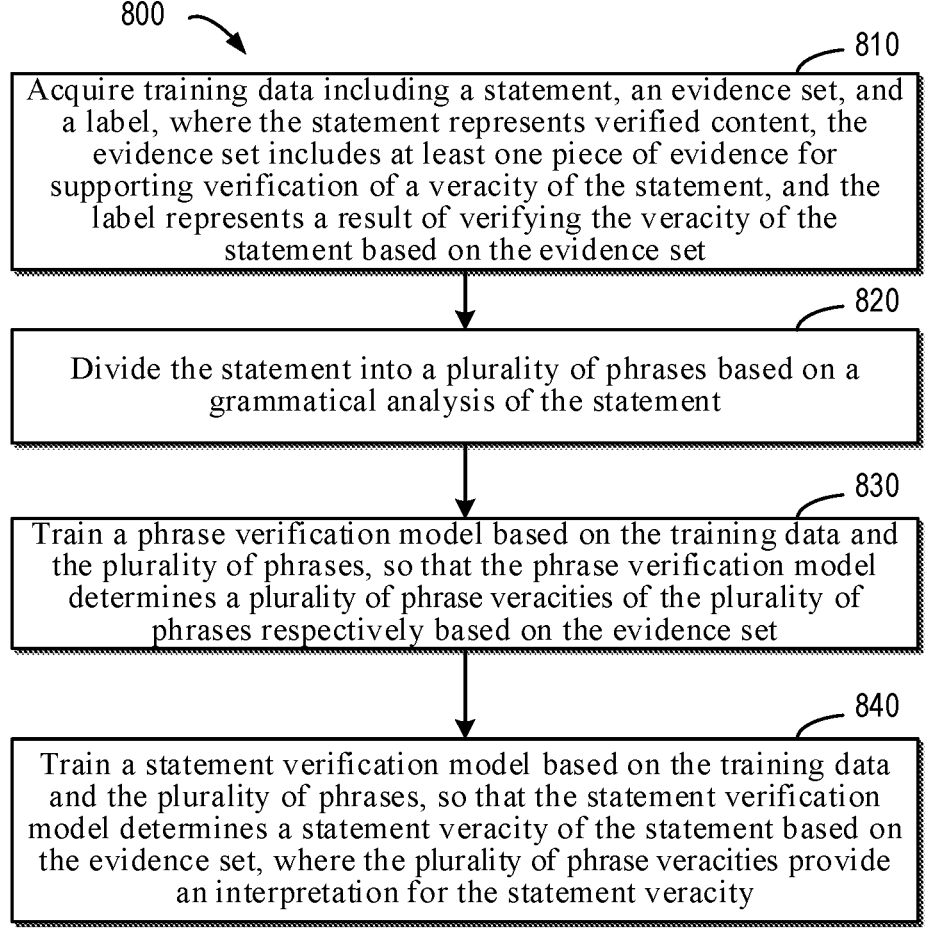

800

810
Acquire training data including a statement, an evidence set, and a label, where the statement represents verified content, the evidence set includes at least one piece of evidence for supporting verification of a veracity of the statement, and the label represents a result of verifying the veracity of the statement based on the evidence set 820
Divide the statement into a plurality of phrases based on a grammatical analysis of the statement 830
Train a phrase verification model based on the training data and the plurality of phrases, so that the phrase verification model determines a plurality of phrase veracities of the plurality of phrases respectively based on the evidence set 840
Train a statement verification model based on the training data and the plurality of phrases, so that the statement verification model determines a statement veracity of the statement based on the evidence set, where the plurality of phrase veracities provide an interpretation for the statement veracity

FIG. 8

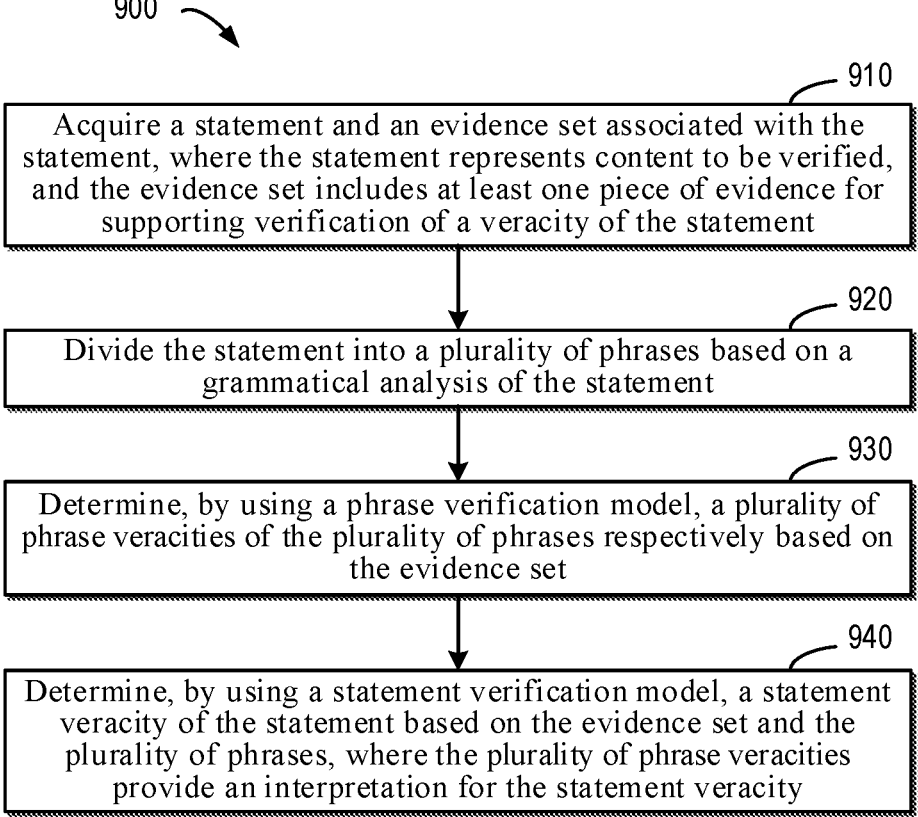

900

910
Acquire a statement and an evidence set associated with the statement, where the statement represents content to be verified, and the evidence set includes at least one piece of evidence for supporting verification of a veracity of the statement 920
Divide the statement into a plurality of phrases based on a grammatical analysis of the statement 930
Determine, by using a phrase verification model, a plurality of phrase veracities of the plurality of phrases respectively based on the evidence set 940
Determine, by using a statement verification model, a statement veracity of the statement based on the evidence set and the plurality of phrases, where the plurality of phrase veracities provide an interpretation for the statement veracity

METHOD, DEVICE, AND APPARATUS FOR VERIFYING VERACITY OF STATEMENT, AND MEDIUM

CROSS REFERENCE TO RELATED APPLICATION

This application is a U.S. National Stage Application of PCT Application Serial No. PCT/CN2022/132139 filed on Aug. 3, 2022, which claims priority to Chinese Application No. 202111356625.8, filed in the China Patent Office on Nov. 16, 2021, and entitled "Method, Device, and Apparatus for Verifying Veracity of Statement, and Medium", the disclosures of which are incorporated herein by reference in their entities.

FIELD

Exemplary implementations of the present disclosure generally relate to the field of computers, and in particular, to a method, a device, and apparatus for verifying a veracity of a statement, and a computer-readable storage medium.

BACKGROUND

With the development of the natural language processing technology, there has been proposed a technical solution for verifying a veracity of a statement in the form of a natural language. However, it is difficult for the existing technical solutions to provide an interpretation regarding a verification result, and the accuracy of the verification result is not satisfactory. Thus, it is desirable to be able to perform verification of a veracity in a more efficient and accurate manner.

SUMMARY

According to exemplary implementations of the present disclosure, a solution for verifying a veracity of a statement is provided.

In a first aspect of the present disclosure, there is provided a method for verifying a veracity of a statement. The method includes: acquiring training data including a statement, an evidence set, and a label, wherein the statement represents verified content, the evidence set includes at least one piece of evidence for supporting verification of the veracity of the statement, and the label represents a result of verifying the veracity of the statement based on the evidence set; dividing the statement into a plurality of phrases based on a grammatical analysis of the statement; training a phrase verification model based on the training data and the plurality of phrases, so that the phrase verification model determines a plurality of phrase veracities of the plurality of phrases respectively based on the evidence set; and training a statement verification model based on the training data and the plurality of phrases, so that the statement verification model determines a statement veracity of the statement based on the evidence set, wherein the plurality of phrase veracities provide an interpretation for the statement veracity.

In a second aspect of the present disclosure, there is provided an electronic device, including: at least one processing unit; and at least one memory, which is coupled to the at least one processing unit and stores instructions for execution by the at least one processing unit, wherein the instructions, when executed by the at least one processing unit, cause the device to perform actions. The actions include: acquiring training data including a statement, an evidence set, and a label, wherein the statement represents verified content, the evidence set includes at least one piece of evidence for supporting verification of the veracity of the statement, and the label represents a result of verifying the veracity of the statement based on the evidence set; dividing the statement into a plurality of phrases based on a grammatical analysis of the statement; training a phrase verification model based on the training data and the plurality of phrases, so that the phrase verification model determines a plurality of phrase veracities of the plurality of phrases respectively based on the evidence set; and training a statement verification model based on the training data and the plurality of phrases, so that the statement verification model determines a statement veracity of the statement based on the evidence set, wherein the plurality of phrase veracities provide an interpretation for the statement veracity.

In a third aspect of the present disclosure, there is provided a method for verifying a veracity of a statement. The method includes: acquiring a statement and an evidence set associated with the statement, wherein the statement represents content to be verified, and the evidence set includes at least one piece of evidence for supporting verification of the veracity of the statement; dividing the statement into a plurality of phrases based on a grammatical analysis of the statement; determining, by using a phrase verification model, a plurality of phrase veracities of the plurality of phrases respectively based on the evidence set; and determining, by using a statement verification model, the statement veracity of the statement based on the evidence set and the plurality of phrases, wherein the plurality of phrase veracities provide an interpretation for the statement veracity.

In a fourth aspect of the present disclosure, there is provided an electronic device, including: at least one processing unit; and at least one memory, which is coupled to the at least one processing unit and stores instructions for execution by the at least one processing unit, wherein the instructions, when executed by the at least one processing unit, cause the device to perform actions. The actions include: acquiring a statement and an evidence set associated with the statement, wherein the statement represents content to be verified, and the evidence set includes at least one piece of evidence for supporting verification of the veracity of the statement; dividing the statement into a plurality of phrases based on a grammatical analysis of the statement; determining, by using a phrase verification model, a plurality of phrase veracities of the plurality of phrases respectively based on the evidence set; and determining, by using a statement verification model, the statement veracity of the statement based on the evidence set and the plurality of phrases, wherein the plurality of phrase veracities provide an interpretation for the statement veracity.

In a fifth aspect of the present disclosure, there is provided an apparatus for verifying a veracity of a statement. The apparatus includes: an acquisition module, configured to acquire training data including a statement, an evidence set, and a label, wherein the statement represents verified content, the evidence set includes at least one piece of evidence for supporting verification of the veracity of the statement, and the label represents a result of verifying the veracity of the statement based on the evidence set; a division module, configured to divide the statement into a plurality of phrases based on a grammatical analysis of the statement; a phrase verification module, configured to train a phrase verification model based on the training data and the plurality of phrases, so that the phrase verification model determines a plurality of phrase veracities of the plurality of phrases respectively based on the evidence set; and a statement verification module, configured to train a statement verification model based on the training data and the plurality of phrases, so that the statement verification model determines the statement veracity of the statement based on the evidence set, wherein the plurality of phrase veracities provide an interpretation for the statement veracity.

In a sixth aspect of the present disclosure, there is provided an apparatus for verifying a veracity of a statement. The apparatus includes: an acquisition module, configured to acquire a statement and an evidence set associated with the statement, wherein the statement represents content to be verified, and the evidence set includes at least one piece of evidence for supporting verification of the veracity of the statement; a division module, configured to divide the statement into a plurality of phrases based on a grammatical analysis of the statement; a phrase verification module, configured to determine, by using a phrase verification model, a plurality of phrase veracities of the plurality of phrases respectively based on the evidence set; and a statement verification module, configured to determine, by using a statement verification model, the statement veracity of the statement based on the evidence set and the plurality of phrases, wherein the plurality of phrase veracities provide an interpretation for the statement veracity.

In a seventh aspect of the present disclosure, there is provided a computer-readable storage medium. A computer program is stored on the medium, and when executed by a processor, the program implements the method in the first aspect.

In an eighth aspect of the present disclosure, there is provided a computer-readable storage medium. A computer program is stored on the medium, and when executed by a processor, the program implements the method in the third aspect.

It should be understood that the content described in the Summary of the present invention is not intended to limit key features or important features of the implementations of the present disclosure, nor is it intended to limit the scope of the present disclosure. Other features of the present disclosure will become readily understood from the following description.

BRIEF DESCRIPTION OF THE DRAWINGS

Hereinafter, the above and other features, advantages and aspects of various implementations of the present disclosure will become more apparent in conjunction with the drawings and with reference to the following detailed description. In the drawings, the same or similar reference signs represent the same or similar elements, wherein.

4

Figure 5:
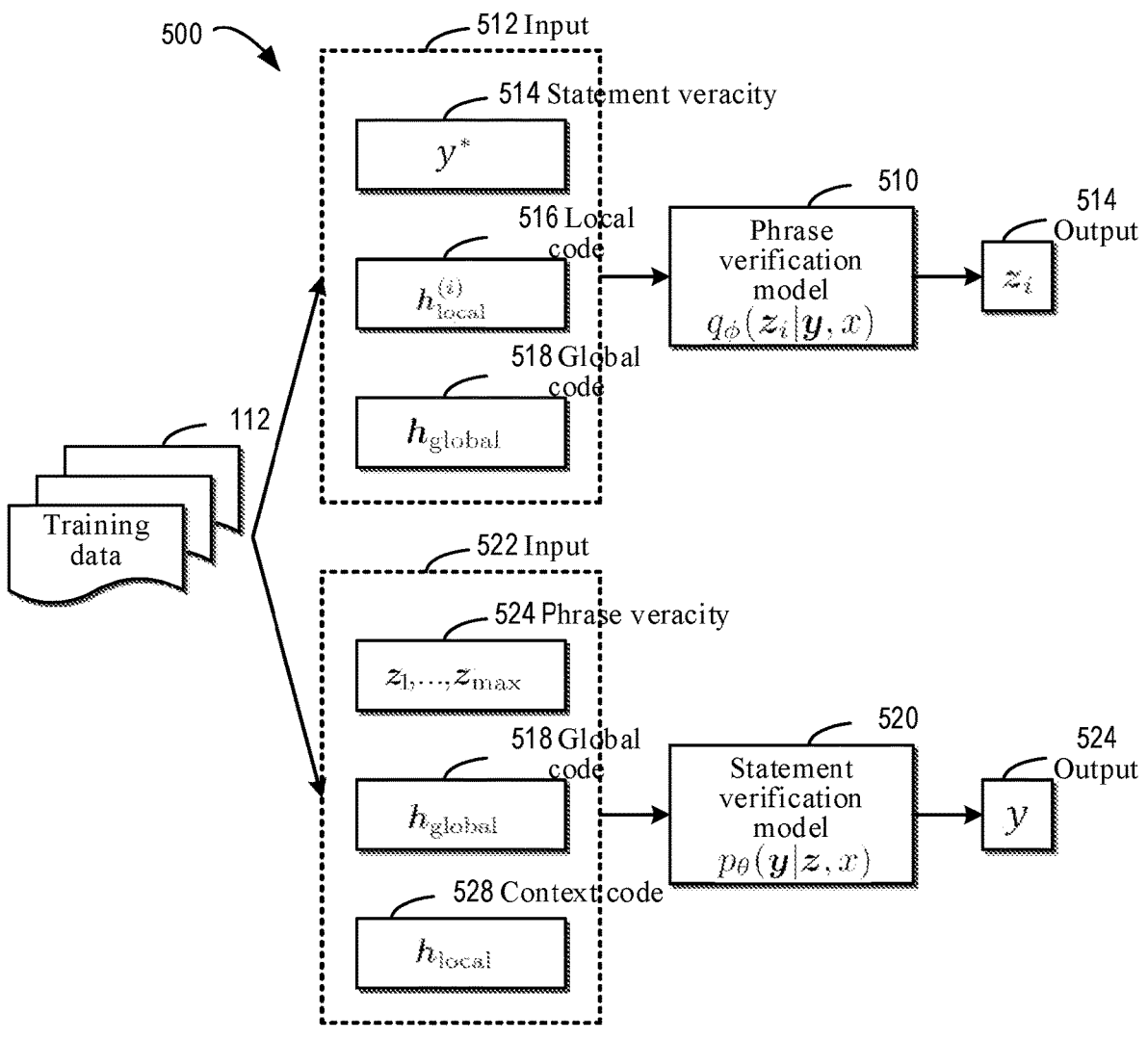
Figure 6:
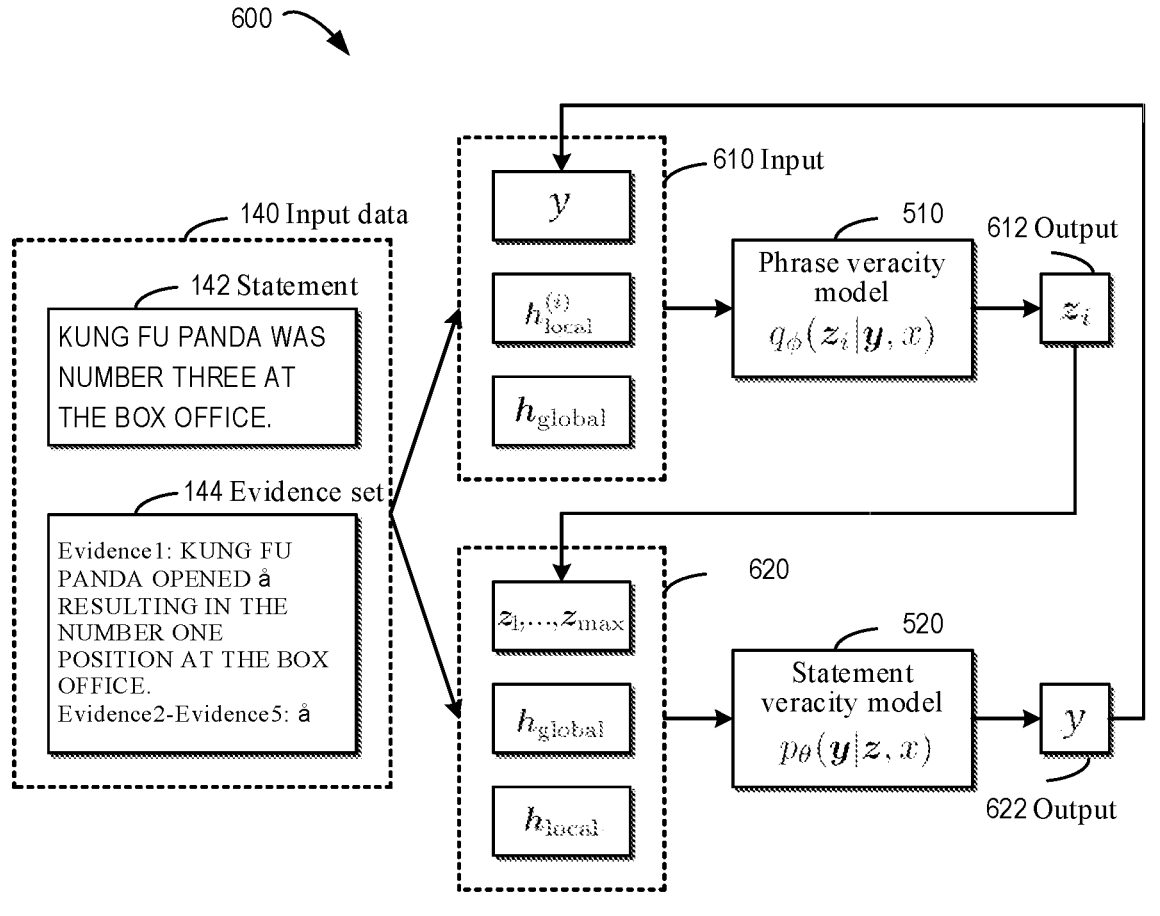
Figure 10A:
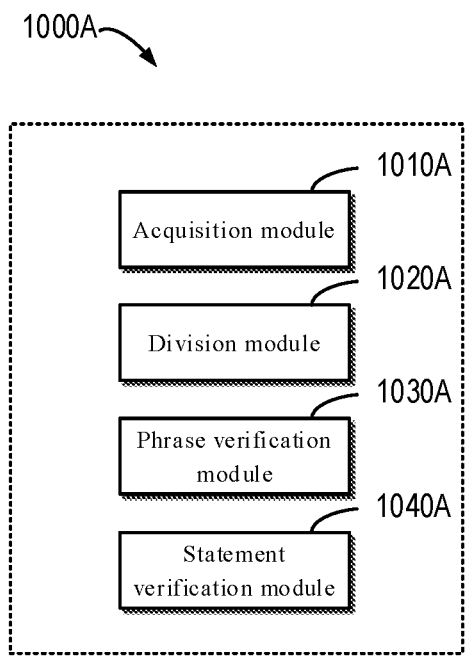
Figure 10B:
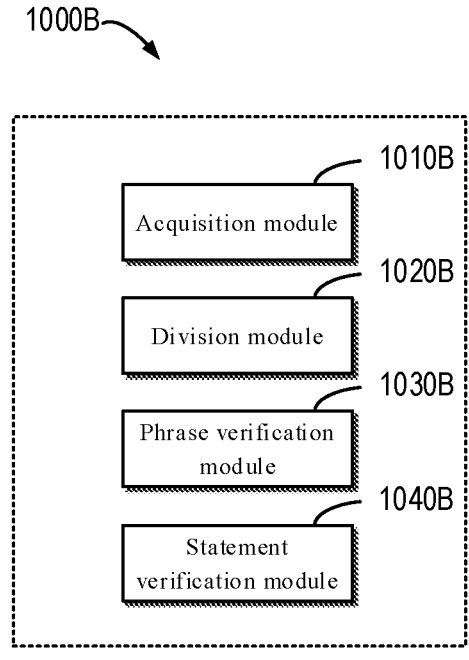
Figure 11:
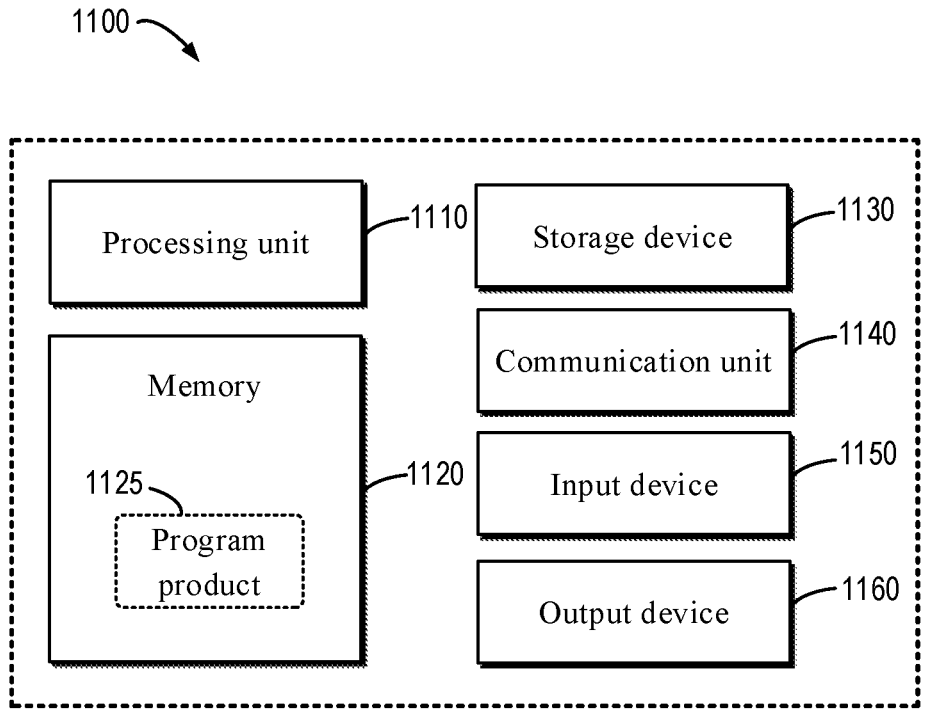

FIG. 5 illustrates a block diagram for training a phrase verification model and a statement verification model according to some implementations of the present disclosure;

FIG. 6 illustrates a block diagram for performing inference based on the phrase verification model and the statement verification model according to some implementations of the present disclosure;

FIG. 7A illustrates a block diagram for determining a veracity of a statement according to some implementations of the present disclosure;

FIG. 7B illustrates a block diagram for determining a veracity of a statement according to some implementations of the present disclosure;

FIG. 8 illustrates a flowchart of a method for verifying a veracity of a statement according to some implementations of the present disclosure;

FIG. 9 illustrates a flowchart of a method for verifying a veracity of a statement according to some implementations of the present disclosure;

FIG. 10A illustrates a block diagram of an apparatus for verifying a veracity of a statement according to some implementations of the present disclosure;

FIG. 10B illustrates a block diagram of an apparatus for verifying a veracity of a statement according to some implementations of the present disclosure; and FIG. 11 illustrates a block diagram of a device capable of implementing a plurality of implementations of the present disclosure.

DETAILED DESCRIPTION OF EMBODIMENTS

The implementations of the present disclosure will be described in more detail below with reference to the drawings. Although some implementations of the present disclosure are shown in the drawings, it should be understood that the present disclosure may be implemented in various forms and should not be construed as being limited to the implementations set forth herein, but rather, these implementations are provided for a more thorough and complete understanding of the present disclosure. It should be understood that the drawings and implementations of the present disclosure are merely for illustrative purposes and are not intended to limit the protection scope of the present disclosure.

In the description of the implementations of the present disclosure, the term "include" and similar terms should be understood as open-ended terms, i.e., "including, but not limited to". The term "based on" should be understood as "based, at least in part, on". The term "one implementation" or "the implementation" should be understood as "at least one implementation". The term "some implementations" should be understood as "at least some implementations". Other explicit and implicit definitions may also be included below.

As used herein, the term "model" may learn an association between a corresponding input and a corresponding output from training data, so that the corresponding output may be generated for the given input after the training is completed. The model may be generated based on the machine learning technology. Deep learning is a machine learning algorithm, which processes the input and provides the corresponding output by using a multi-layer processing unit. A neural network model is one example of a model based on deep learning. Herein, the "model" may also be referred to as a "machine learning model", a "learning model", a "machine learning network" or a "learning network", and these terms may be used interchangeably herein.

A "neural network" is a machine learning network based on deep learning. The neural network may process the input and provide the corresponding output, and the neural network typically includes an input layer, an output layer, and one or more implicit layers between the input layer and the output layer. The neural network used in a deep learning application typically includes many implicit layers, thereby increasing the depth of the network. Various layers of the neural network are connected in sequence, so that the output of the previous layer is provided as the input of the latter layer, where the input layer receives the input of the neural network, and the output of the output layer is used as a final output of the neural network. Each layer of the neural network includes one or more nodes (which are also referred to as processing nodes or neurons), and each node processes the input from the previous layer.

Generally, machine learning may generally include three phases, i.e., a training phase, a test phase, and an application phase (which is also referred to as an inference phase). In the training phase, a given model may be trained by using a large amount of training data, and parameter values are continuously iterated and updated until the model may acquire, from the training data, consistent inference satisfying an expected target. By means of training, the model may be considered to be able to learn the association (which is also referred to as mapping from the input to the output) between the input and the output from the training data. The parameter values of the trained model are determined. In the test phase, a test input is applied to the trained model to test whether the model may provide a correct output, so as to determine the performance of the model. In the application phase, the model may be used to process an actual input based on the parameter values obtained by training, so as to determine a corresponding output.

In the field of statement verification, a verification model may be trained by using a large amount of training data, which include a statement, an evidence set, and a label, so that the verification model can verify a veracity of a statement based on the input evidence set.

Example Environment

Figure 1:
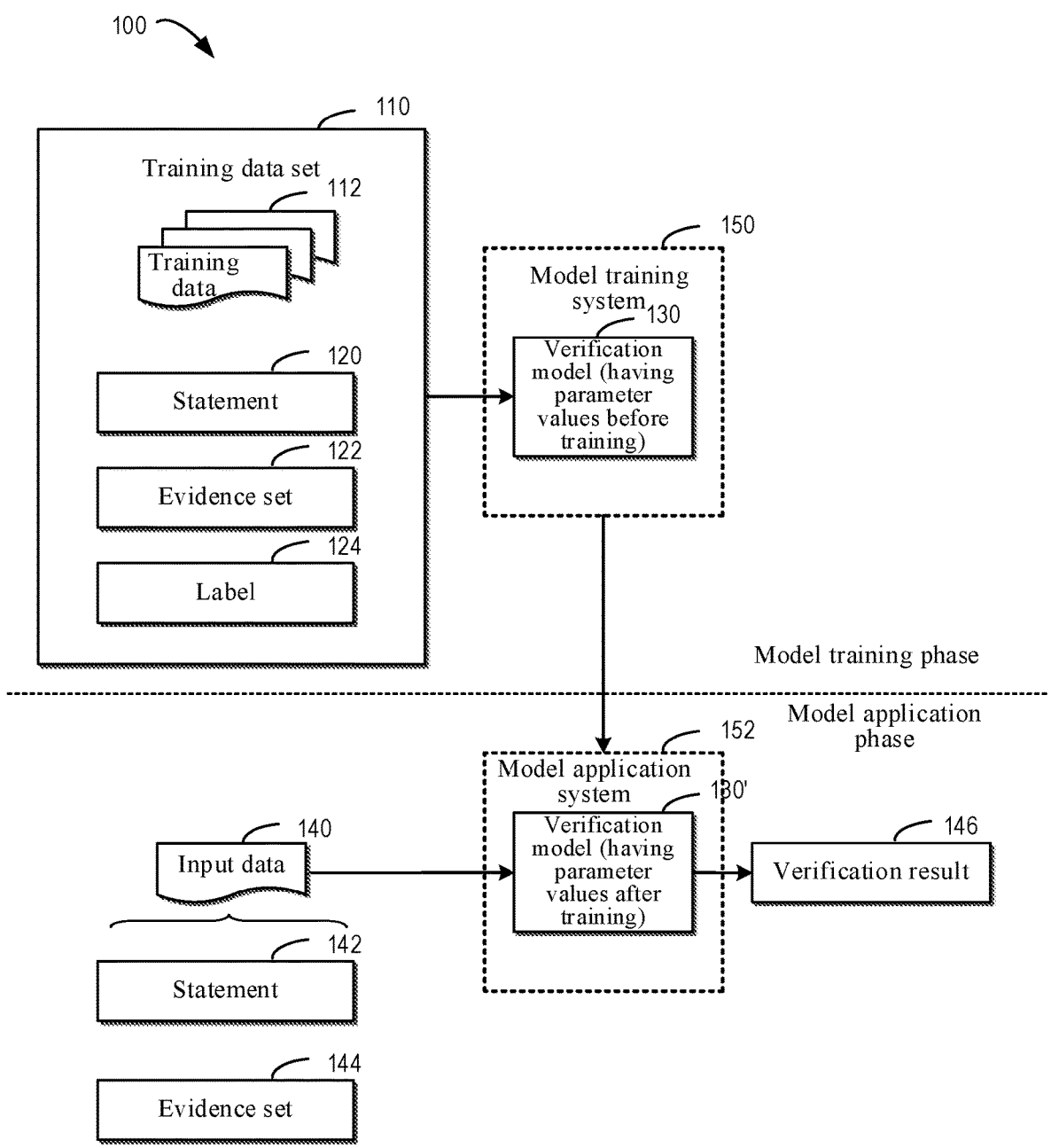
FIG. 1 illustrates a block diagram of an example environment in which implementations of the present disclosure may be implemented.

FIG. 1 illustrates a block diagram of an example environment 100 in which implementations of the present disclosure may be implemented. In the environment 100 of FIG. 1, it is desirable to train and use such a model (i.e., a verification model 130), the model is configured to receive a statement 120 and an evidence set 122, and verify a veracity of the statement 120 based on the evidence set 122. As shown in FIG. 1, the environment 100 includes a model training system 150 and a model application system 152, and the verification model 130 may be implemented by using the machine learning technology. The upper part of FIG. 1 illustrates the process of a model training phase, and the lower part illustrates the process of a model application phase. Before training, parameter values of the verification model 130 may have initial values, or may have pre-trained parameter values obtained in a pre-training process. By means of the training process, the parameter values of the verification model 130 may be updated and adjusted. After the training is completed, a verification model 130' may be obtained. At this time, the parameter values of the verification model 130' have been updated, and based on the updated parameter values, the verification model 130' may be used for implementing a verification task in the application phase.

In the model training phase, based on a training data set 110 including multiple pieces of training data 112, the verification model 130 may be trained by using the model training system 150. Here, each piece of training data 112 may involve a triple format, for example, including the statement 120, the evidence set 122 (e.g., including evidence from resources such as encyclopedia and news), and a label 124. In the context of the present disclosure, the statement and the evidence set may be represented in one or more natural languages. Hereinafter, specific details regarding a verification process will be described just taking English as an example of the natural language. According to one exemplary implementation of the present disclosure, the statement 120 and the evidence set 122 may also be represented in any language, including, but not limited to, Chinese, Japanese, French, Russian, Spanish, etc.

In the context of the present disclosure, the statement 120 may be represented in a natural language, for example, the statement 120 may include "Bob won the 2020 election", the evidence set 122 may include one or more pieces of evidence from resources such as encyclopedia and news, and the label 124 may include a label for indicating whether content of the statement 120 is veracious and reliable. For example, "supported", "refuted", or "unverifiable". The verification model 130 may be trained by using the training data 112, which includes the statement 120, the evidence set 122 and the label 124. Specifically, the training process may be iteratively performed by using a large amount of training data. After the training is completed, the verification model 130' may verify whether the content of the statement is veracious based on the statement and the evidence set in the input data. In the model application phase, the verification model 130' may be invoked by using the model application system 152 (at this time, the verification model 130' has trained parameter values), and may perform the above verification task. For example, an input 140 (including a statement 142 and an evidence set 144) may be received, and a verification result 146 is output.

In FIG. 1, the model training system 150 and the model application system 152 may include any computing system with computing capabilities, for example, various computing devices/systems, terminal devices, servers, and the like. The terminal device may involve any types of mobile terminals, fixed terminals or portable terminals, including mobile phones, desktop computers, laptop computers, notebook computers, netbook computers, tablet computers, media computers, multimedia tablet computers, or any combinations of the foregoing, accessories and peripherals including these devices, or any combinations thereof. The server includes, but is not limited to, large computers, edge computing nodes, computing devices in a cloud environment, etc.

It should be understood that, the components and arrangements in the environment 100 shown in FIG. 1 are merely examples, and a computing system suitable for implementing the exemplary implementations described in the present disclosure may include one or more different components, other components, and/or different arrangement modes. For example, although shown as being separate, the model training system 150 and the model application system 152 may be integrated in the same system or device. The implementations of the present disclosure are not limited in this aspect. Exemplary implementations of model training and model applications will be respectively described below with continued reference to the drawings.

Architecture of Verification Model

At present, multiple verification solutions have been implemented based on the machine learning technology. According to one technical solution, a statement represented in a natural language may be received, and a verification result of "supported", "refuted", or "unverifiable" is given for whether the content of the statement is veracious. However, the technical solution can neither verify the veracity of each part in the statement, nor explain why a certain verification result is given. According to another technical solution, a certain part in the statement may be highlighted, so as to indicate that the current verification result is obtained based on the part. However, the above-mentioned technical solution can only give a verification result with the statement as a whole, but cannot individually evaluate the veracity of each part in the statement. Thus, it is desirable to provide a verification solution with a finer granularity.

According to one exemplary implementation of the present disclosure, a technical solution for verifying the veracity of a statement is provided. Specifically, a statement (e.g., represented as c) represented in a natural language may be received, and an evidence set (e.g., represented as E) for supporting an veracity verification process is acquired. The evidence set may be acquired based on a variety of techniques which are currently known and/or will be developed in the future, for example, the evidence set may be acquired by using a KGAT algorithm. How to verify the veracity of the statement based on the acquired evidence set will be described in detail below.

In the context of the present disclosure, the statement may represent content to be verified, the evidence set may include at least one piece of evidence for supporting verification of the veracity of the statement, and a label may represent a result of verifying the veracity of the statement based on the evidence set. For example, in one piece of training data, the statement may include "Bob won the 2020 election", the evidence set may include text descriptions from a plurality of data sources, and the label may include "refuted". In the training data, the label indicates that the content of the statement is not veracious.

According to one exemplary implementation of the present disclosure, the verification model 130 may be constructed to complete the above verification process. Here, the verification target is to predict the following probability distribution: $p(y|c, E)$, $y \in \{SUP, REF, NEI\}$. That is, c is classified into SUP, REF or NEI based on E, wherein SUP represents "supported", REF represents "refuted", and "NEI" represents an undetermined state of neither "supported" nor "refuted". Based on the verification model, the statement may be divided into a plurality of phrases (a phrase set may be represented as $W_c$, and each phrase may be represented as $w_i$, and $w_i \in W_c$). For example, each phrase may be extracted based on a heuristic rule, and the phrase may include a named entity (NE), a verb phrase, an adjective phrase (AP), a noun phrase (NP), etc.

For example, in the statement of "Bob won the 2020 election", "Bob" represents NE, "won" represents the verb phrase, and "the 2020 election" represents NP. Further, a prediction may be performed at a phrase level. For example, the veracity of each phrase may be represented by using $p(z_i|c, w_i, E)$ (wherein $z_i \in \{SUP, REF, NEI\}$). By using the exemplary implementations of the present disclosure, not only can the statement veracity of the entire statement be determined, but the phrase veracity of each phrase can also be determined respectively. Here, the phrase veracity may provide an interpretation for the statement veracity, that is, the veracity of the statement is determined based on which phrase(s) is set forth. In this way, a more accurate verification solution with higher granularity can be provided.

Figure 2:
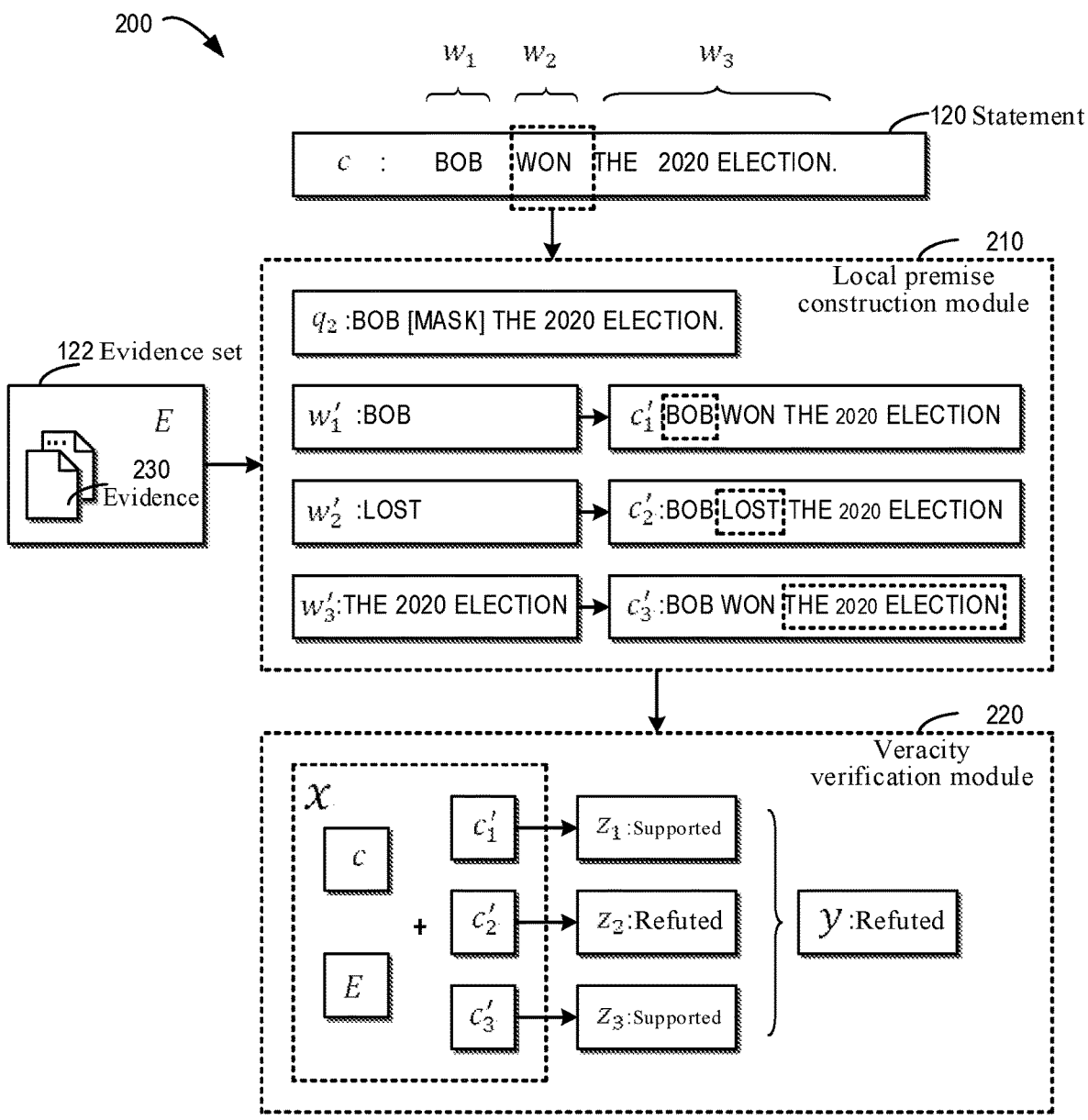
FIG. 2 illustrates a block diagram of a verification model for verifying a veracity of a statement according to some implementations of the present disclosure.

Hereinafter, a summary of the verification model according to one exemplary implementation of the present disclosure will be described first with reference to FIG. 2. FIG. 2 illustrates a block diagram 200 of a verification model for verifying the veracity of a statement according to some implementations of the present disclosure. The details of the verification model are described with the training data 112 as a specific example in FIG. 2. As shown in FIG. 2, the statement 120 in the training data 112 is "Bob won the 2020 election", and the evidence set 122 in the training data 112 may include one or more pieces of evidence 230. Here, the evidence 230 may be a piece of evidence retrieved based on a variety of technical solutions, which have been developed at present and/or will be developed in the future, and thus the evidence 230 is used as a basis for veracity verification. The evidence 230 may include a variety of types, including, but not limited to, encyclopedia, news, textbooks, papers, etc.

Grammatical analysis may be performed on the statement 120 based on a variety of natural language processing technologies, so as to divide the statement 120 (represented by a symbol c) into a plurality of phrases. For example, each phrase may be represented by a symbol $w_i$. In this example, $w_1$ represents "Bob", $w_2$ represents "won", and $w_3$ represents "the 2020 election". A local premise of each phrase may be respectively determined by using a local premise construction module 210. Specifically, a probing question $q_i$ may be constructed for each phrase, an evidence phrase $$w_i'$$

matching the phrase $w_i$ is determined from the evidence set, and then a corresponding local premise $$c_i'$$

is determined. With the phrase $w_2$ as an example, a probing question $q_2$ may be constructed for the phrase, and an answer $$w_2'$$

to the probing question is determined from the evidence set 122. Further, the phrase $w_2$ in the statement may be replaced with $$w_2'$$

to generate a corresponding local premise $$c_2'.$$

According to one exemplary implementation of the present disclosure, similar processing may be performed on each phrase, so as to obtain a corresponding local premise.

Then, an veracity verification module 220 may perform processing based on the original statement c, the evidence set E and the generated local premises $$c_1', c_2' \text{ and } c_3',$$

so as to determine a phrase veracity $z_i$ of each phrase and a statement veracity y of the entire statement.

By using the exemplary implementations of the present disclosure, not only can the statement veracity of the entire statement be determined, but the phrase veracity of each phrase can also be respectively determined with a finer granularity. Here, the phrase veracity may provide an interpretation for why the verification result of "supported", "refuted", or "unverifiable" is given. In this way, the veracity of each part in the statement may be determined with a finer granularity, thereby improving the accuracy of veracity verification. The summary of the verification model has been described with reference to FIG. 2, and more details regarding the verification model will be described below respectively in conjunction with the training phase and the application phase.

Model Training Process

Figure 3:
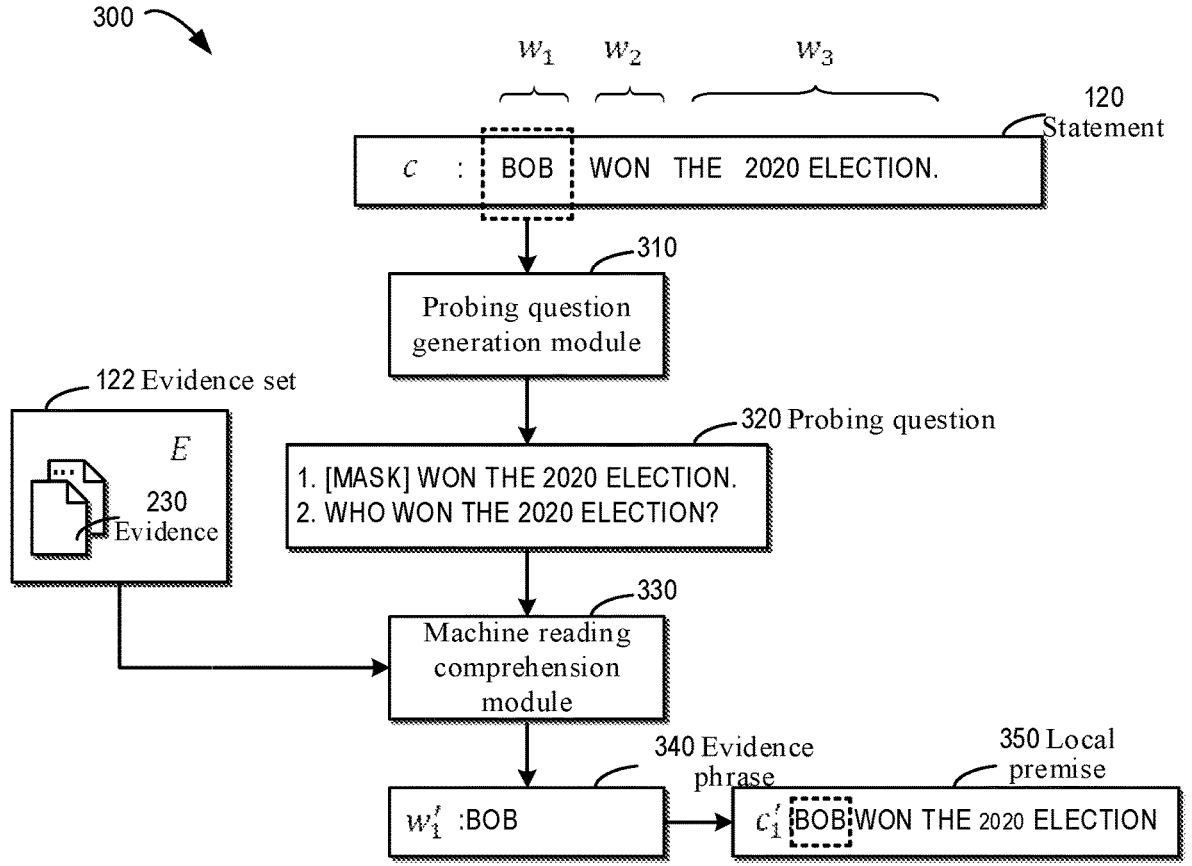
FIG. 3 illustrates a block diagram for determining a local premise according to some implementations of the present disclosure.

Hereinafter, more details regarding the training process will be described with reference to the drawings. According to one exemplary implementation of the present disclosure, a training data set 110 including multiple pieces of training data 112 may be acquired. Further, similar processing may be performed for each piece of training data, so as to iteratively train the verification model by using the multiple pieces of training data. How to determine a local premise from the training data will be described first with reference to FIG. 3. FIG. 3 illustrates a block diagram 300 for determining a local premise according to some implementations of the present disclosure.

As shown in FIG. 3, a grammatical analysis may be performed for the statement 120, so as to divide the statement into a plurality of phrases $w_1$, $w_2$, and $w_3$. According to one exemplary implementation of the present disclosure, in order to divide the statement 120 into the plurality of phrases, a set $W_c$ of a plurality of phrases included in the statement c may be determined by using a plurality of extraction algorithms, which are currently known and/or will be developed in the future. For example, a verb may be identified by using a part-of-speech (POS) parsing tool. As another example, a noun phrase may be identified by using a syntax component analysis tool. In order to refine the identification granularity of the noun phrase, the noun phrase may be further split by using the POS parsing tool and a named entity recognizer. According to one exemplary implementation of the present disclosure, a plurality of heuristic rules may be used for assistance, for example, 1) all leaf node noun phrases may be parsed by using the syntax component analysis tool, and all verbs are identified by using the POS parsing tool; and 2) the leaf node noun phrases are split by using the named entity recognizer, so as to obtain fine-grained noun phrases and corresponding adjective phrases.

According to one exemplary implementation of the present disclosure, the verification model may include a phrase verification model and a statement verification model. The phrase verification model includes an association relationship among the statement, the evidence set, and the phrase veracity of each phrase in the statement, and may determine the phrase veracity of each phrase in the statement. The statement verification model may include an association relationship among the statement, the evidence set, and the statement veracity of the statement, and may determine the statement veracity of the statement.

After the plurality of phrases have been obtained, the phrase verification model may be trained based on the training data and the plurality of phrases, so that the phrase verification model determines a plurality of phrase veracities of the plurality of phrases respectively based on the evidence set. First, each phrase may be processed to determine the local premise corresponding to each phrase. Hereinafter, the process of determining the local premise $$c_1'$$

is described just taking the phrase $w_1$ as an example, and herein, the local premise represents knowledge for verifying the veracity of the phrase. According to one exemplary implementation of the present disclosure, phrase evidence 340 matching each phrase may be determined from the evidence set 122 by using a probing question generation module 310 and an MRC module 330. Here, the phrase evidence 340 may represent a knowledge point for determining the veracity of the phrase. Hereinafter, more details of determining the phrase evidence 340 are described with reference to FIG. 3.

According to one exemplary implementation of the present disclosure, a probing question 320 may be generated for the phrase $w_i$ by using the probing question generation module 310. The probing question may be generated in a variety of manners, for example, the phrase $w_i$ may be removed from the statement c to generate, as the probing question $q_i$, a cloze statement associated with the statement c. With regard to the phrase $w_i$, the phrase "Bob" may be removed from the statement 120, at this time, the probing question 320 may be represented as: "won the 2020 election". That is, at this time, the probing question 320 is not a complete sentence, but is a cloze statement including an unknown part " ".

As another example, the probing question may be represented by using an interrogative sentence. Specifically, an interrogative sentence for querying a phrase may be generated based on a position of the phrase in the statement, and the interrogative sentence is used as the probing question. For example, it may be determined based on a grammatical analysis that the phrase "Bob" is located at the position of a subject in the statement. At this time, the interrogative sentence "Who won the 2020 election" may be used as the probing question. By using the exemplary implementations of the present disclosure, the relationship between the phrase and the statement can be conveniently described by constructing the probing question, such that the meaning of each phrase in a language environment specified by the statement can be conveniently retrieved in the evidence set 122.

According to one exemplary implementation of the present disclosure, information required for verifying each phrase may be found from the evidence set 122. Further, a set of local premises may be constructed based on these pieces of information. Specifically, the above process may be converted into an MRC task. According to one exemplary implementation of the present disclosure, an evidence phrase 340 associated with the phrase may be determined based on the MRC module 330. Here, the MRC module 330 may include a pre-trained MRC model. The probing question 320 and the evidence set 122 may be input to the MRC model, and the MRC model may output an answer to the probing question 320, which is acquired from the evidence set 122.

Figure 4:
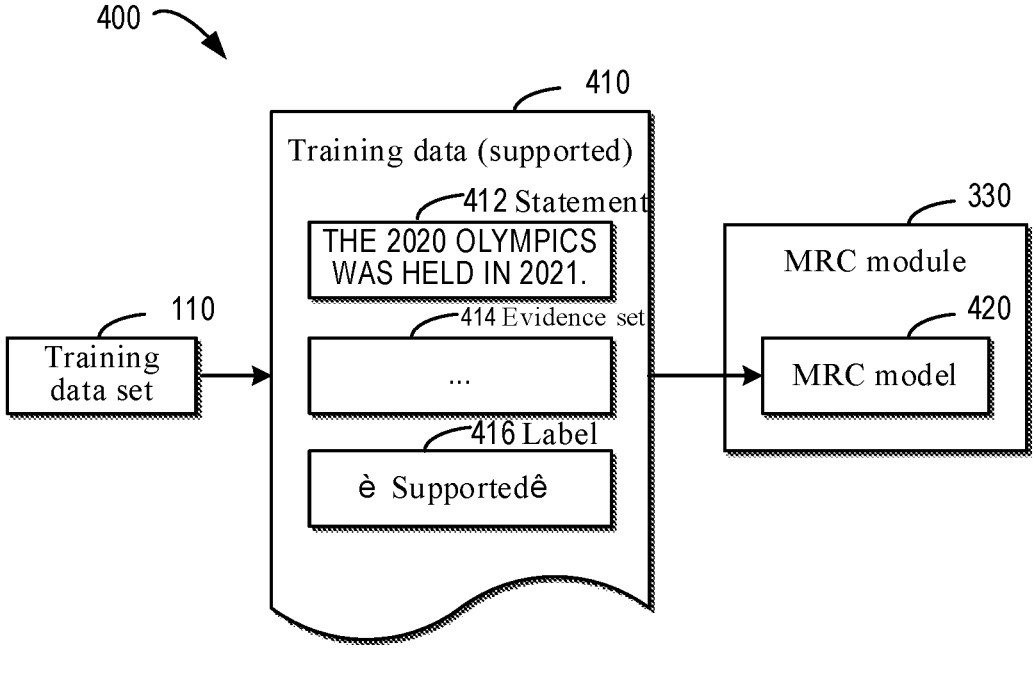
FIG. 4 illustrates a block diagram for training a machine reading comprehension (MRC) model according to some implementations of the present disclosure.

It will be understood that the MRC model may be acquired based on a plurality of manners which are currently known and/or will be developed in the future. According to one exemplary implementation of the present disclosure, a method for training the MRC model based on a self-supervised way is provided. Hereinafter, more details regarding the training process are described with reference to FIG. 4. FIG. 4 illustrates a block diagram 400 for training an MRC model according to some implementations of the present disclosure. As shown in FIG. 4, an MRC model 420 may be trained by using the training data set 110. It will be understood that the training data set 110 herein may include a large amount of training data, and each piece of training data may include three parts, that is, a statement, an evidence set, and a label. Here, the MRC model includes an association relationship between the question and the evidence set, and an answer to the input question may be found from the evidence set.

According to one exemplary implementation of the present disclosure, an initial reading comprehension model may be established, the model may be trained, and an answer output by the trained reading comprehension model is made to be consistent with a real answer to the probing question. In order not to increase the workload of acquiring the training data, the same training data set 110 may be used to train various models in the verification model. To train the MRC model, training data meeting a predetermined condition may be acquired from the training data set. It will be understood that only the training data with the label of "supported" is selected, so as to train the MRC model with the selected training data.

Specifically, the MRC model may be trained based on the self-supervised way, at this time, training data 410 with the label of "supported" may be selected from the training data set 110. As shown in FIG. 4, a statement 412 of the training data 410 may include "The 2020 Game was held in 2021", an evidence set 414 includes one or more pieces of evidence, which are used for verifying the statement and are associated with "2020 Game", and a label 416 may include "supported". Since the label of the training data 410 is "supported", the training data may be used to train the MRC model 420. In the training process, a probing question "The 2020 Game was held in" may be generated, and "2021" is directly used as the answer to the probing question. Further, the MRC model 420 may be trained based on the probing question, the evidence set 414, and the answer.

It will be understood that, it is difficult to find a real correct answer from the corresponding evidence set for the training data with the label of "refuted" or "unverifiable", thus when the MRC model 420 is trained, these pieces of training data may be abandoned and only the training data with the label of "supported" is used. In this way, the training data set 110 may be reused as much as possible, and various related overheads for preparing the training data in the training process are reduced.

According to one exemplary implementation of the present disclosure, the MRC model 420 may be trained based on the methods described above. Further, the trained MRC model 420 may be used to determine the answer to each probing question. Specifically, for each phrase $w_i$ ($w_i \in W_c$), the probing question $q_i$ may be generated first by using the probing question generator 310 described above, and a set of all probing questions $q_i$ may be represented as $Q(q_i \in Q)$. Q and E may be input to the MRC model, and then an answer set $W_E$ for all probing questions may be obtained.

According to one exemplary implementation of the present disclosure, after the evidence phrase matching the phrase has been determined based on the evidence set, the phrase in the statement may be replaced with the evidence phrase to generate a local premise. Returning to FIG. 3, for the phrase $w_1$ "Bob", the found evidence phrase 340 is $$w'_1 : \text{"Bob"}.$$

At this time, the phrase $w_1$ in the statement c may be replaced with $$w'_1$$

to generate the local premise.

It will be understood that the process of generating the local premise $$c'_1$$

is described above just taking the phrase $w_1$ as an example. In the context of the present disclosure, similar processing may be performed for each of the phrases $w_2$ and $w_3$, so as to generate corresponding local premises $$c'_2 \text{ and } c'_3.$$

For example, with regard to the second phrase $w_2$ "won", at this time $$w'_2 = \text{"lost"},$$

the local premise $$c'_2$$

may be represented as "Bob lost the 2020 election". A set of local premises may be represented as $\{c'_i\}_{i=1}^{|W_c|}$. Further, the phrase verification model and the statement verification model may be trained by using the training data and the determined plurality of local premises.

Hereinafter, a mathematical principle related to the verification model is first described. In the context of the present disclosure, the verification model may provide veracity verification for the statement at the phrase level. Specifically, the phrase verification model may determine the veracity of the phrase, and the statement verification model may determine the veracity of the statement. According to one exemplary implementation of the present disclosure, an objective function for training the phrase verification model and the statement verification model may be established. Specifically, for each phrase $w_i \in W_c$, the veracity of the phrase may be represented as a latent variable $z_i$ of one out of three (e.g., one of SUP, REF, or NEI). At this time, $z=(z_1, z_2, \ldots, z_{|W_c|})$ may be defined, wherein $|W_c|$ represents the number of phrases in the statement c. At this time, the veracity y of the statement c depends on the latent variable z.

According to one exemplary implementation of the present disclosure, the concept of logical rule constraint is proposed. It will be understood that, there is a logical constraint between the phrase veracity of each phrase in the statement and the statement veracity of the statement. The logical rule constraint between the multiple phrase veracities and the statement veracity may be acquired. Specifically, 1) for the REF label, if the evidence set refutes at least one of the plurality of phrases, the statement veracity is REF; 2) for the SUP label, if the evidence set supports all of the plurality of phrases, the statement veracity is SUP; and 3) for the NEI label, if neither the above two conditions are met, the verification result is unverifiable. Therefore, the verification model may be constructed based on the above three constraint relationships. Specifically, the logical rule constraint shown in the following Formula 1 may be defined:

$$V(c, W_c, E) \vDash \top, \text{ iff } \forall w \in W_c, V(c, w, E) \vDash \top \qquad \text{Formula 1}$$

$$V(c, W_c, E) \vDash \bot, \text{ iff } \exists w \in W_c, V(c, w, E) \vDash \bot$$

$$V(c, W_c, E) \vDash \ominus, \text{ iff } \forall w \in W_c, V(c, w, E) \vDash \{\top, \ominus\}$$

wherein, c represents the statement, E represents the evidence set on which the execution of a verification process is based, $W_c$ represents a set of phrases included in c, and $V(c, W_c, E)$ represents one of three numerical values (i.e., supported, refuted, and unverifiable). For $W_c$ and E, $V(c, W_c, E)$ corresponds to one of three predetermined labels $y \in \{SUP, REF, NEI\}$.

According to one exemplary implementation of the present disclosure, a latent variable model may be established, and the foregoing logical rule constraint may be further applied to the latent variable model. For the statement c and the acquired evidence set E, a target distribution $p_\theta=(y|x)$ may be defined:

$$p_\theta(y \mid x) = \sum_z p_\theta(y \mid z, x) p(z \mid x) \qquad \text{Formula 2}$$

Here, $p(z|x)$ represents a priori distribution based on an input x ($x=(c, E)$) on the latent variable z, and $p_\theta$ represents a probability of y under the conditions of x and z. Here, it is assumed that $z_i$ is independent of each other, that is, $p(z|x)=\Pi_i p(z_i|x, w_i)$. For a truth-value label $y^*$ in the training data, the objective function shown below may be constructed:

$$\mathcal{L}(\theta) = -\log p_\theta(y^* \mid x) \qquad \text{Formula 3}$$

Theoretically, the model may be optimized by using an expectation-maximization (EM) algorithm. However, it is difficult to determine $p_\theta(z|y, x)$ due to a huge space of z in actual operation, and thus a variational posteriori distribution may be determined based on a variational inference algorithm. Specifically, a negative evidence lower bound (negative ELBO) may be minimized, and an objective function related to the variable may be represented by using Formula 4:

$$\underbrace{- \underset{q_\phi(z|y,x)}{\mathbb{E}} [\log p_\theta(y^* \mid z, x))] + D_{KL}(q_\phi(z \mid y, x) \| p(z \mid x))}_{negative\ ELBO:\ \mathcal{L}_{var}(\theta,\phi)} \qquad \text{Formula 4}$$

wherein, $q_\phi(\cdot)$ represents the variational posteriori distribution with y and x as conditions, $D_{KL}$ represents the distance between the two distributions, and $\theta$ and $\phi$ respectively represent all parameters related to the distributions $p_\theta$ and $q_\phi$ described above. Further, the meanings of other symbols are the same as the meanings of the symbols in the existing ELBO algorithm, and thus details are not described again. Specifically, a pre-trained natural language inference (NLI) model may be used as the priori distribution $p(z|x)$ (parameters thereof are fixed). Here, the NLI model may generate distributions of three types: CONTRADICTED, NEUTRAL and ENTAILMENT, and the three types may respectively correspond to "refuted", "unverifiable", and "supported" in the present disclosure.

Further, the logical rule constraint may be introduced based on logical knowledge distillation. That is, the objective function may be updated by using the logical rule constraint shown in Formula 1, so that a relationship between a plurality of phrase veracities and the statement veracity output by the verification model, which is trained based on the objective function, meets the logical rule constraint. According to one exemplary implementation of the present disclosure, a knowledge distillation method is provided, and the method may use a teacher model and a student model to construct a final objective function. Here, the student model $p_\theta(y|z,x)$ is a target expected to be optimized, and the variational distribution $q_\phi(z|y,x)$ may be mapped to a subspace $$q_\phi^T(y_z|y, x)$$

to construct the teacher model. Here, since the subspace $y_z$ is a logical aggregation of z, the subspace is constrained by a logical rule represented by Formula 1 described above. Thus, the output of $$q_\phi^T$$

can be simulated to apply a logical constraint indication to $p_\theta$. Specifically, a distillation loss may be determined based on the following Formula 5:

$$\mathcal{L}_{logic}(\theta, \phi) = D_{XL}(p_\theta(y|z, x) \| q_\phi^T(y_x|y, x)) \qquad \text{Formula 5}$$

wherein, $\mathcal{L}_{logic}(\theta, \phi)$ represents the objective function related to the logical rule constraint, and $D_{KL}$ represents the distance between the two distributions. Further, in the case where both the objective function related to the variables in the training data and the objective function related to the logical rule constraint are considered, an objective function for jointly training the phrase verification model and the statement verification model may be established. Here, the objective function enables the relationship between the statement veracity and the label to meet a predetermined condition, and may enable the relationship between the phrase veracity and the statement veracity to meet the logical rule constraint. Specifically, a final objective function may be determined based on the following Formula 6:

$$\mathcal{L}_{final}(\theta, \phi) = (1 - \lambda)\mathcal{L}_{var}(\theta, \phi) + \lambda\mathcal{L}_{logic}(\theta, \phi) \qquad \text{Formula 6}$$

wherein, $\mathcal{L}_{final}(\theta, \phi)$ represents the final objective function, $\mathcal{L}_{var}(\theta, \phi)$ represents the objective function related to the variables in the training data, $\mathcal{L}_{logic}(\theta, \phi)$ represents the objective function related to the logical rule constraint, and $1-\lambda$ and $\lambda$ represent weights for the two types of objective functions respectively. By using the exemplary implementations of the present disclosure, the logical rule constraint can be applied to the process of constructing the objective function, so that the objective function not only considers the training data in the training data set, but also considers the logical rule constraint between the phrase veracity and the statement veracity. In this way, the verification model may provide an interpretation for the verification result of the statement at the phrase level.

According to one exemplary implementation of the present disclosure, a soft logic solution may be used in the training and regularization of latent variables processes. Specifically, an aggregation operation may be performed based on the following Formula 7:

$$q_\phi^Z(y_z = SUP) = \prod_{i=1}^{|z|} q_\phi(z_i = SUP) \qquad \text{Formula 7}$$

$$q_\phi^T(y_z = REF) = 1 - \prod_{i=1}^{|z|} (1 - q_\theta)(z_i = REF)$$

$$q_\phi^T(y_z = NEI) = 1 - q_\phi^T(y_z = SUP) - q_\phi^T(y_z = REF)$$

wherein, $$q_\phi^T$$

represents information related to the rule-regularized subspace, wherein $y_z$ may be respectively equal to SUP REF or NEI.

$$\sum_{y_z} q_\phi^T(y_z) = 1 \text{ and } \sum_{z_i} q_\phi^T(z_i) = 1.$$

In this way, $\mathcal{L}_{logic}$ shown in Formula 5 described above may be specified, and then the veracity of the phrase may be determined in the case that the logical rule constraint is met.

According to one exemplary implementation of the present disclosure, the training data may be encoded, and then parameterization $p_\theta(y|z,x)$ and variational distribution $q_\phi(z|y, x)$ may be performed by using the phrase verification model and the statement verification model respectively, so as to perform iterative optimization based on a variational EM algorithm. Hereinafter, more details regarding the training of the phrase verification model and the statement verification model will be described with reference to FIG. 5.

FIG. 5 illustrates a block diagram 500 for training a phrase verification model and a statement verification model according to some implementations of the present disclosure. As shown in FIG. 5, input data for training a phrase verification model 510 and a statement verification model 520 may be determined based on the training data 112. At this time, an input 512 of the phrase verification model 510 may include a statement veracity 514, a local code 516, and a global code 518. An input 522 of the statement verification model 520 may include phrase veracity 524, the global code 518, and a context code 528. How to calculate the above parameters will be illustrated below in specific formulas.

In the training phase, the statement veracity 514 may be determined based on the label (i.e., truth-value data) for indicating the statement veracity in the training data 112. Further, for the given c, E and the local premise for each phrase, a text representation may be calculated by using a pre-trained language model (PLM). For example, the statement c and each local premise $$c_i'$$

may be concatenated to obtain a text representation $$\{x_{local}^{(i)} = (c, c_i')\}$$

related to the local code 516. Then, the text representation may be mapped to the local code 516

$$\text{(i.e., } \{h_{local}^{(i)} \in \mathbb{R}^d\}, \mathbb{R}^d$$

represents an encoding space) by using an encoder. According to one exemplary implementation of the present disclosure, the above encoding process may be performed by using a plurality of encoders which are currently known and/or will be developed in the future.

Similarly, the statement c and the evidence set E may be concatenated to obtain a text representation $x_{global}=(c, E)$ associated with the global code 518. Then, the text representation may be encoded to obtain the global code 518 (i.e., $h_{global} \in \mathbb{R}^d$). Further, a self-selection model may be applied to obtain the most important part in the encoding.

It will be understood that, there may be a culprit phrase (i.e., a phrase affecting the statement veracity) among the plurality of phrases, therefore a culprit phrase attention model may be designed based on the following experience: an effective local premise (i.e., a local premise beneficial to outputting a statement veracity conforming to the actual situation) should be semantically close to the evidence in the evidence set. Thus, the importance $\alpha_i$ of each phrase $w_i$ may be determined based on the similarity between $$h_{local}^{(i)}$$

and $h_{global}$. Specifically, the context code $h_{local}$ may be determined based on the following Formula 8:

$$h_{local} = \tanh\left(\sum_{i=1}^{|W_e|} \alpha_1 h_{local}^{(i)}\right); \; \alpha_i = \sigma\left(W_\alpha\left[h_{global} : h_{local}^{(i)}\right]\right) \qquad \text{Formula 8}$$

wherein, $W_\alpha \in \mathbb{R}^{1 \times 2 \times d}$ represents a parameter, and $\sigma$ represents a softmax function. After the above parameters are calculated, both $p_\theta(\cdot)$ and $q_\phi(\cdot)$ may be applied to a two-layer or multi-layer perception model. As shown in FIG. 5, the input of $q_\phi(z_i|y,x)$ may include a concatenation of the following three parameters: the statement veracity 514 (y*) the local code 516

$$\left(h_{local}^{(i)}\right)$$

and the global code 518 ($h_{local}$), and the output 514 may include $z_i$(i.e., the probability of the phrase veracity of each phrase). Here. $q\phi(z|y, x)=$Further, the input 522 of $p_\theta(y|z, x)$ may include a concatenation of the following three parameters: the phrase veracity 524 ($z=(z_1, z_2, \ldots, z_{max})$), at this time, max represents a maximum length of padding), the global code 518 ($h_{global}$) and the context code 528 ($h_{local}$), and the output 524 may include y (i.e., the statement veracity).

According to one exemplary implementation of the present disclosure, joint optimization may be performed on $q_\phi(\cdot)$ and $p_\theta(\cdot)$ in the training process by using the objective function shown in Formula 6 described above. That is, the phrase verification model 510 and the statement verification model 520 are jointly trained by using the objective function. Iterative optimization may be performed by using a variety of optimization technologies which are currently known and/or will be developed in the future. For example, a Gumbel representation algorithm may be used to perform a discrete argmax operation, so as to perform optimization.

It will be understood that, $\theta$ and $\phi$ represented in Formula 6 respectively represent all parameters related to the distributions $p_\theta$ and $q_\phi$ described above. In a specific training process, the specific value $$\left(\text{e.g., } y^*, h_{local}^{(i)}, h_{global}, z_i, h_{local}, \text{ and the like}\right)$$

of each parameter, which is determined based on the training data set, may be respectively substituted into Formula 6, so as to perform the training process. At this time, the part associated with the phrase verification model 510 in the objective function may involve the label, the local code, and the global code, and the part associated with the statement verification model 520 in the objective function may involve the phrase veracity, the global code, and the context code. By means of setting a unified objective function, on one hand, the internal logic dependency relationship between the two models can be considered, and on the other hand, various overheads involved in the training can also be reduced.

Each piece of training data in the training data set 110 may be processed one by one in a similar manner, so as to obtain various parameters for performing the training. The training process may be iteratively performed by using the obtained parameters, until each model meets a predetermined stop condition. At this time, the trained statement verification model 520 may output the statement veracity of the statement, and the trained phrase verification model 510 may output the phrase veracity of each phrase, and the phrase veracity may provide an interpretation for the statement veracity herein.

According to one exemplary implementation of the present disclosure, the veracity may be represented in a probability distribution manner. For example, when the probability distribution of the veracity is represented in the order of SUP, REF and NEI, it is assumed that the statement veracity is (0.8, 0.1, 0.1), at this time, the probability 0.8 associated with SUP is the maximum value, then the statement veracity is "SUP" at this time, that is, supported. According to one exemplary implementation of the present disclosure, the phrase veracity may be represented in a similar manner, which will not be repeated hereinafter.

The process for training the verification model has been described above, the verification model at this time can not only verify the veracity of the statement, but also process each phrase in the statement with a finer granularity, and verify the phrase veracity of each phrase. In this way, the phrase veracity may represent the contribution of the corresponding phrase to the final veracity of the statement, and thus may provide an interpretation for the final verification result.

Model Application Process

The training of the verification model 130 has been described above, and the trained verification model 130' may be provided for the model application system 152 as shown in FIG. 1 for use, so as to process the input data 140. Specifically, after the model training phase has been completed, the received input may be processed by using the trained verification model 130' having the trained parameter values. Returning to FIG. 1, more information regarding the model application process is described. The input data 140 may be input to the trained verification model 130'. Here, the input data 140 may include the statement 142 to be verified and the evidence set 144 for supporting the verification. The fully trained verification model 130' may receive the input data 140, and verify the veracity of the statement 142 based on one or more pieces of evidence in the evidence set 144.

More details regarding an inference process are described below with reference to FIG. 6. FIG. 6 illustrates a block diagram 600 for performing inference based on the phrase verification model and the statement verification model according to some implementations of the present disclosure. As shown in FIG. 6, the input data 140 may include, e.g., the statement 142 and the evidence set 144. Here, the statement 142 represents content to be verified, and the evidence set 144 includes at least one piece of evidence for supporting verification of the veracity of the statement. In the inference phase, each module in the verification model is operated in a manner similar to the training process. For example, the statement 142 may be divided into a plurality of phrases based on a grammatical analysis, and a parameter associated with each phrase is determined.

Further, the phrase verification model 510 may be used to determine a plurality of phrase veracities of the plurality of phrases respectively based on the evidence set 144. The specific values of various parameters in inputs 610 and 620 may be respectively determined according to the method described above. The statement verification model 520 may be used to determine the statement veracity of the statement based on the evidence set 144 and the plurality of phrase veracities (i.e., an output 612), and the plurality of phrase veracities provide an interpretation for the statement veracity herein. It will be understood that, in the initial phase, the phrase verification model 510 may set the plurality of phrase veracities to be a plurality of predetermined initial values respectively, for example, (0.4, 0.3, 0.3), or other numerical values. At this time, the value of the output 612 shown in FIG. 6 is (0.4, 0.3, 0.3). This value may be used as the input of the statement verification model 520, and is used for determining the statement veracity (i.e., an output 622) together with the global code $h_{global}$ and the context code $h_{local}$, which are determined from the input data 140. At this time, the first round of inference operation is ended.

According to one exemplary implementation of the present disclosure, the inference process described above may be iteratively performed in a plurality of rounds. Specifically, in the second round, the output 622 may be used as the input y of the phrase verification model 510, and is used together with the local code $$h_{local}^{(i)}$$

and the global code $h_{global}$, which are determined from the input data, so as to acquire new phrase veracity at the output 612. Then, the new phrase veracity may be input to the statement verification model 520, so as to obtain new statement veracity at the output 622. It will be understood that the iteration process is described above with only the first and second rounds as examples. According to one exemplary implementation of the present disclosure, one or more subsequent rounds may also be performed after the second round until a predetermined stop condition is met.

According to one exemplary implementation of the present disclosure, the stop condition may be specified as, for example, when the difference between the output results of the two consecutive rounds is less than a predetermined threshold value, the iteration process is stopped. As another example, the stop condition may also be specified as: when the veracity indicated by probability distributions of two or more consecutive rounds not longer changes, the iteration process is stopped. As another example, the stop condition may also be specified as: the iteration process is stopped when reaching a predetermined number of rounds. By using the exemplary implementations of the present disclosure, the verification model can not only output the statement veracity for the entire statement, but also can process each phrase in the statement with a finer granularity. Further, the phrase veracity of each phrase may be output to provide an interpretation for the statement veracity.

The summary of processing the input data by using verification model has been described above. Hereinafter, specific examples of processing the input data by using the verification model will be described with reference to FIG. 7A and FIG. 7B respectively. FIG. 7A illustrates a block diagram 700A for determining the veracity of a statement according to some implementations of the present disclosure. As shown in FIG. 7A, the statement 142 and the evidence set 144 may be received. The statement 142 may be divided into a plurality of phrases 712A, 714A and 716A, and further, local premises associated with the phrases may be determined respectively. Specifically, a local premise 730A illustrates local premises associated with the phrases 712A, 714A and 716A.

As shown in FIG. 7A, a premise 1 represents a local premise associated with the phrase 712A, and the phrase veracity of the phrase 712A is "supported" (as shown by a maximum value 732A). A premise 2 represents a local premise associated with the phrase 714A, and the phrase veracity of the phrase 714A is "refuted" (as shown by a maximum value 734A). A premise 3 represents a local premise associated with the phrase 716A, and the phrase veracity of the phrase 716A is "supported" (as shown by a maximum value 736A). Further, as shown by a maximum value 742A, a prediction 740A illustrates a prediction result "refuted" of the veracity verification. The example illustrates the case where the prediction result is consistent with a truth value, therefore the phrase veracity can provide a prediction result with a finer granularity, and can provide an interpretation for the final prediction result.

FIG. 7B illustrates a block diagram 700B for determining the veracity of a statement according to some implementations of the present disclosure. As shown in FIG. 7B, a statement 710B and an evidence set 720B may be received. The statement 710B may be divided into a plurality of phrases 712B and 714B. Further, local premises associated with the phrases may be determined respectively. Specifically, a local premise 730B illustrates local premises associated with the phrases 712B and 714B.

As shown in FIG. 7B, the premise 1 represents a local premise associated with the phrase 712B, and the phrase veracity of the phrase 712B is "supported" (as shown by a maximum value 732B). The premise 2 represents a local premise associated with the phrase 714B, and the phrase veracity of the phrase 714B is "refuted" (as shown by a maximum value 734B). Further, as shown by a maximum value 742B, a prediction 740B illustrates a prediction result "refuted" of the veracity verification. The example illustrates the case where the prediction result is inconsistent with the truth value ("unverifiable"). At this time, it can be seen from the analysis of each phrase veracity that, the phrase veracity "refuted" of the phrase 714B results in an error in the prediction result. In this way, the phrase veracity may reflect an error cause to a certain extent, thereby facilitating further optimization of the verification model.

Example Process

FIG. 8 illustrates a flowchart of a method 800 for verifying the veracity of a statement according to some implementations of the present disclosure. Specifically, at block 810, training data including a statement, an evidence set, and a label is acquired, where the statement represents verified content, the evidence set includes at least one piece of evidence for supporting verification of the veracity of the statement, and the label represents a result of verifying the veracity of the statement based on the evidence set. At block 820, the statement is divided into a plurality of phrases based on a grammatical analysis of the statement. At block 830, a phrase verification model is trained based on the training data and the plurality of phrases, so that the phrase verification model determines a plurality of phrase veracities of the plurality of phrases respectively based on the evidence set.

According to one exemplary implementation of the present disclosure, in order to train the phrase verification model, the phrases among the plurality of phrases may be processed one by one. Specifically, a local premise associated with the phrase may be determined based on the evidence set, the local premise represents knowledge for verifying the veracity of the phrase. A phrase veracity verification model may be trained based on the local premise and the training data.

According to one exemplary implementation of the present disclosure, in order to determine the local premise, an evidence phrase matching the phrase may be determined based on the evidence set, the evidence phrase represents a knowledge point for determining the veracity of the phrase. Further, the phrase in the statement may be replaced with the evidence phrase to generate the local premise.

According to one exemplary implementation of the present disclosure, in order to determine the evidence phrase, a probing question associated with the phrase may be generated based on the statement. Then, an answer to the probing question is retrieved in the evidence set, so as to serve as the evidence phrase.

According to one exemplary implementation of the present disclosure, the phrase may be removed from the statement, to take a cloze statement associated with the statement as the probing question.

According to one exemplary implementation of the present disclosure, based on a position of the phrase in the statement, an interrogative sentence for querying the phrase may be used as the probing question.

According to one exemplary implementation of the present disclosure, the label includes any of the following: "supported", "refuted" and "unverifiable". According to one exemplary implementation of the present disclosure, in order to retrieve the answer, a reading comprehension model may be established, and the reading comprehension model enables the answer to be consistent with a real answer to the probing question. Another piece of training data including a statement, an evidence set and a label may be acquired. If a label of the other piece of training data is "supported", the other piece of training data may be used to train the reading comprehension model.

At block 840, a statement verification model is trained based on the training data and the plurality of phrases, so that the statement verification model determines the statement veracity of the statement based on the evidence set, where the plurality of phrase veracities provide an interpretation for the statement veracity.

According to one exemplary implementation of the present disclosure, an objective function for jointly training the phrase verification model and the statement verification model may be established, and the objective function enables a relationship between the statement veracity and the label to meet a predetermined condition. According to one exemplary implementation of the present disclosure, the phrase verification model and the statement verification model may be jointly trained by using the objective function.

According to one exemplary implementation of the present disclosure, a logical rule constraint between the plurality of phrase veracity and the statement veracity may be acquired. The objective function may be updated based on the logical rule constraint, and the objective function enables a relationship between the plurality of phrase veracities and the statement veracity to meet the logical rule constraint.

According to one exemplary implementation of the present disclosure, in order to establish the objective function, a plurality of local codes associated with the plurality of phrases may be determined respectively based on the statement and a plurality of local premises. A global code of the statement may be determined based on the statement and the evidence set. The objective function may be determined by using the label, the plurality of local codes, and the global code as parameters.

According to one exemplary implementation of the present disclosure, in order to establish the objective function, a plurality of pieces of importance of the plurality of phrases may be respectively determined based on the comparison between the plurality of local premises and the statement. A context code of the statement may be determined based on the plurality of pieces of importance and the plurality of local codes. The plurality of phrase veracities, the context code, and the global code may be used as parameters.

FIG. 9 illustrates a flowchart of a method 900 for verifying the veracity of a statement according to some implementations of the present disclosure. At block 910, a statement and an evidence set associated with the statement may be acquired, where the statement represents content to be verified, and the evidence set includes at least one piece of evidence for supporting verification of the veracity of the statement. At block 920, the statement may be divided into a plurality of phrases based on a grammatical analysis of the statement. At block 930, a phrase verification model may be used to determine a plurality of phrase veracities of the plurality of phrases respectively based on the evidence set.

According to one exemplary implementation of the present disclosure, in an initial phase, the plurality of phrase veracities may be set to be a plurality of predetermined initial values respectively. According to one exemplary implementation of the present disclosure, in a subsequent phase after the initial phase, a plurality of phrase veracities are determined based on the evidence set and the statement veracity.

At block 940, a statement verification model may be used to determine the statement veracity of the statement based on the evidence set and the plurality of phrases, where the plurality of phrase veracities provide an interpretation for the statement veracity.

According to one exemplary implementation of the present disclosure, the method 900 may be iteratively performed until a relationship between the plurality of phrase veracities and the statement veracity meets a predetermined stop condition.

Example Apparatus and Device

FIG. 10A illustrates a block diagram of an apparatus 1000A for verifying the veracity of a statement according to some implementations of the present disclosure. As shown in FIG. 10A, the apparatus 1000A includes an acquisition module 1010A, a division module 1020A, a phrase verification module 1030A, and a statement verification module 1040A.

According to one exemplary implementation of the present disclosure, the acquisition module 1010A is configured to acquire training data including a statement, an evidence set, and a label, where the statement represents content to be verified, the evidence set includes at least one piece of evidence for supporting verification of the veracity of the statement, and the label represents a result of verifying the veracity of the statement based on the evidence set; the division module 1020A is configured to divide the statement into a plurality of phrases based on a grammatical analysis of the statement; the phrase verification module 1030A is configured to train a phrase verification model based on the training data and the plurality of phrases, so that the phrase verification model determines a plurality of phrase veracities of the plurality of phrases respectively based on the evidence set; and the statement verification module 1040A is configured to train a statement verification model based on the training data and the plurality of phrases, so that the statement verification model determines the statement veracity of the statement based on the evidence set, where the plurality of phrase veracities provide an interpretation for the statement veracity.

According to one exemplary implementation of the present disclosure, the phrase verification module is further configured to: for a phrase among the plurality of phrases, determine a local premise associated with the phrase based on the evidence set, where the local premise represents knowledge for verifying the veracity of the phrase; and train a phrase veracity verification model based on the local premise and the training data.

According to one exemplary implementation of the present disclosure, the phrase verification module is further configured to: determine an evidence phrase matching the phrase based on the evidence set, where the evidence phrase represents a knowledge point for determining the veracity of the phrase; and replace the phrase in the statement with the evidence phrase to generate the local premise.

According to one exemplary implementation of the present disclosure, the phrase verification module is further configured to: generate a probing question associated with the phrase based on the statement; and retrieve an answer to the probing question from the evidence set, so as to serve as the evidence phrase.

According to one exemplary implementation of the present disclosure, the phrase verification module is further configured to: remove the phrase from the statement, to take a cloze statement associated with the statement as the probing question; and take an interrogative sentence for querying the phrase as the probing question based on a position of the phrase in the statement.

According to one exemplary implementation of the present disclosure, the label includes any of: "supported", "refuted", and "unverifiable". The phrase verification module is further configured to: establish a reading comprehension model, where the reading comprehension model enables the answer to be consistent with a real answer to the probing question; acquire another piece of training data including a statement, an evidence set, and a label; and in response to a label of the other piece of training data being "supported", use the other piece of training data to train the reading comprehension model.

According to one exemplary implementation of the present disclosure, the apparatus further includes: an establishment module, configured to establish an objective function for jointly training the phrase verification model and the statement verification model, where the objective function enables a relationship between the statement veracity and the label to meet a predetermined condition. The phrase verification module and the statement verification module are further configured to: jointly train the phrase verification model and the statement verification model by using the objective function.

According to one exemplary implementation of the present disclosure, the establishment module is further configured to: acquire a logical rule constraint between the plurality of phrase veracities and the statement veracity; and update the objective function based on the logical rule constraint, where the objective function enables a relationship between the plurality of phrase veracities and the statement veracity to meet the logical rule constraint.

According to one exemplary implementation of the present disclosure, the establishment module is further configured to: determine a plurality of local codes respectively associated with the plurality of phrases based on the statement and a plurality of local premises; determine a global code of the statement based on the statement and the evidence set; and determine the objective function by using the label, the plurality of local codes, and the global code as parameters.

According to one exemplary implementation of the present disclosure, the establishment module is further configured to: determine a plurality of pieces of importance of the plurality of phrases respectively based on a comparison between the plurality of local premises and the statement; determine a context code of the statement based on the plurality of pieces of importance and the plurality of local codes; and determine the objective function by using the plurality of phrase veracities, the context code, and the global code as parameters.

FIG. 10B illustrates a block diagram of an apparatus 1000B for verifying the veracity of a statement according to some implementations of the present disclosure. As shown in FIG. 10B, the apparatus 1000B includes an acquisition module 1010B, a division module 1020B, a phrase verification module 1030B, and a statement verification module 1040B.

According to one exemplary implementation of the present disclosure, the acquisition module 1010B is configured to acquire training data including a statement, an evidence set, and a label, where the statement represents content to be verified, the evidence set includes at least one piece of evidence for supporting verification of the veracity of the statement, and the label represents a result of verifying the veracity of the statement based on the evidence set; the division module 1020B is configured to divide the statement into a plurality of phrases based on a grammatical analysis of the statement; the phrase verification module 1030B is configured to train a phrase verification model based on the training data and the plurality of phrases, so that the phrase verification model determines a plurality of phrase veracities of the plurality of phrases respectively based on the evidence set; and the statement verification module 1040B is configured to train a statement verification model based on the training data and the plurality of phrases, so that the statement verification model determines the statement veracity of the statement based on the evidence set, where the plurality of e phrase veracities provide an interpretation for the statement veracity.

According to one example implementation of the present disclosure, the phrase verification module 1030B is further configured to: in an initial phase, set the plurality of phrase veracities to be a plurality of predetermined initial values respectively; and in a subsequent phase after the initial phase, determine the plurality of phrase veracities based on the evidence set and the statement veracity.

According to one exemplary implementation of the present disclosure, the phrase verification module 1030B and the statement verification module 1040B are iteratively invoked until a relationship between the plurality of phrase veracities and the statement veracity meets a predetermined stop condition.

FIG. 11 illustrates a block diagram of a device 100 capable of implementing a plurality of implementations of the present disclosure. It should be understood that a computing device 1100 shown in FIG. 11 is merely exemplary and should not constitute any limitation on the functions and scopes of the implementations described herein. The computing device 1100 shown in FIG. 11 may be used for implementing the model training system 150 as shown in FIG. 1, and may also be used for implementing the model application system 152 as shown in FIG. 1.

As shown in FIG. 11, the computing device 1100 is in the form of a general-purpose computing device. Components of the computing device 1100 may include, but are not limited to, one or more processors or processing units 1110, a memory 1120, a storage device 1130, one or more communication units 1140, one or more input devices 1150, and one or more output devices 1160. The processing unit 1110 may be an actual or virtual processor and may perform various processing according to programs stored in the memory 1120. In a multi-processor system, multiple processing units execute computer-executable instructions in parallel to improve the parallel processing capability of the computing device 1100.

The computing device 1100 generally includes a plurality of computer storage media. Such media may be any available media accessible to the computing device 1100, including, but not limited to, volatile and non-volatile media, removable and non-removable media. The memory 1120 may be a volatile memory (e.g., a register, a cache, a random access memory (RAM)), a non-volatile memory (e.g., a read only memory (ROM), an electrically erasable programmable read only memory (EEPROM), a flash memory), or a certain combination thereof. The storage device 1130 may be a removable or non-removable medium, and may include a machine-readable medium, such as a flash memory drive, a magnetic disk, or any other media, which may be used for storing information and/or data (e.g., training data for training) and may be accessed in the computing device 1100.

The computing device 1100 may further include additional removable/non-removable, volatile/non-volatile storage media. Although not shown in FIG. 11, a disk drive for reading or writing from a removable and non-volatile magnetic disk (e.g., a "floppy disk") and an optical disk drive for reading or writing from a removable and non-volatile optical disk may be provided. In these cases, each drive may be connected to a bus (not shown) by one or more data medium interfaces. The memory 1120 may include a computer program product 1125, which is provided with one or more program modules, and these program modules are configured to perform various methods or actions in various implementations of the present disclosure.

The communication unit 1140 implements communication with other computing devices by means of a communication medium. Additionally, the functions of the components of the computing device 1100 may be implemented in a single computing cluster or a plurality of computing machines, and these computing machines may perform communication by means of a communication connection. Accordingly, the computing device 1100 may operate in a networked environment by using a logical connection to one or more other servers, a network personal computer (PC), or another network node.

The input device 1150 may be one or more input devices, such as a mouse, a keyboard, a trackball, or the like. The output device 1160 may be one or more output devices, such as a display, a speaker, a printer, or the like. The computing device 1100 may also communicate with one or more external devices (not shown) by means of the communication unit 1140 as needed, the external device is, for example, a storage device, a display device, or the like, and the computing device 1100 communicates with one or more devices that cause a user to interact with the computing device 1100, or communicates with any device (e.g., a network card, a modem, or the like) that causes the computing device 1100 to communicate with one or more other computing devices. Such communication may be performed via an input/output (I/O) interface (not shown).

According to one exemplary implementation of the present disclosure, provided is a computer-readable storage medium, on which a computer-executable instruction is stored, wherein the computer-executable instruction is executed by a processor to implement the method described above. According to one exemplary implementation of the present disclosure, further provided is a computer program product, wherein the computer program product is tangibly stored on a non-transitory computer-readable medium and includes a computer-executable instruction, and the computer-executable instruction is executed by a processor to implement the method described above. According to one exemplary implementation of the present disclosure, provided is a computer program product, on which a computer program is stored, wherein when executed by a processor, the program implements the method described above.

Here, various aspects of the present disclosure are described with reference to flowcharts and/or block diagrams of the method, the apparatus, the device and the computer program product according to the implementations of the present disclosure. It should be understood that, each block of the flowcharts and/or the block diagrams and combinations of various blocks in the flowcharts and/or the block diagrams may be implemented by computer-readable program instructions.

These computer-readable program instructions may be provided for a general-purpose computer, a special-purpose computer or processing units of other programmable data processing apparatuses, so as to generate a machine, such that these instructions, when executed by the computers or the processing units of the other programmable data processing apparatuses, generate apparatuses used for implementing specified functions/actions in one or more blocks of the flowcharts and/or the block diagrams. These computer-readable program instructions may also be stored in the computer-readable storage medium, these instructions cause the computers, the programmable data processing apparatuses and/or other devices to work in particular manners, such that the computer-readable storage medium storing the instructions includes a manufacture, which includes instructions for implementing various aspects of the specified functions/actions in one or more blocks of the flowcharts and/or the block diagrams.

The computer-readable program instructions may be loaded on the computers, the other programmable data processing apparatuses or the other devices, so as to execute a series of operation steps on the computers, the other programmable data processing apparatuses or the other devices to produce processes implemented by the computers, such that the instructions executed on the computers, the other programmable data processing apparatuses or the other devices implement the specified functions/actions in one or more blocks of the flowcharts and/or the block diagrams.

The flowcharts and the block diagrams in the drawings show system architectures, functions and operations that may be implemented by the system, the method and the computer program product according to a plurality of implementations of the present disclosure. In this regard, each block in the flowcharts and the block diagrams may represent a part of a module, a program segment or an instruction, and the part of the module, the program segment or the instruction contains one or more executable instructions for implementing specified logical functions. In some alternative implementations, the functions annotated in the blocks may also occur in a different order from the order annotated in the drawings. For example, two consecutive blocks may actually be executed substantially in parallel, or they may sometimes be executed in a reverse order, depending on the functions involved. It should also be noted that, each block in the block diagrams and/or the flowcharts, and the combination of the blocks in the block diagrams and/or the flowcharts may be implemented by a dedicated hardware-based system that is used for executing the specified functions or actions, or it may be implemented by a combination of dedicated hardware and computer instructions.

The various implementations of the present disclosure have been described above, and the above description is exemplary, not exhaustive, and is not limited to the various disclosed implementations. Without departing from the scope and spirit of the various described implementations, many modifications and changes are obvious to those ordinary skilled in the art. The choice of the terms used herein is intended to best explain the principles of various implementations, practical applications, or improvements to the technology in the market, or to enable other ordinary skilled in the art to understand the various implementations disclosed herein.

What is claimed is:

1. A method, comprising:
acquiring training data comprising a statement, an evidence set, and a label, wherein the statement represents verified content, the evidence set comprises at least one piece of evidence for supporting verification of the veracity of the statement, and the label represents a result of verifying the veracity of the statement based on the evidence set;
dividing the statement into a plurality of phrases based on a grammatical analysis of the statement;
determining a plurality of local premises based on the evidence set, wherein each of the plurality of local premises corresponds to one of the plurality of phrases, and wherein each of the plurality of local premises comprises a modified version of the statement in which the corresponding one of the plurality of phrases has been replaced with an evidence phrase generated based on the evidence set;
training a phrase verification model based on the training data and the plurality of local premises, so that the phrase verification model determines a plurality of phrase veracities of the plurality of phrases respectively based on the evidence set;
training a statement verification model based on the training data and the plurality of local premises, so that the statement verification model determines a statement veracity of the statement based on the evidence set, wherein the plurality of phrase veracities provide an interpretation for the statement veracity; and
applying the trained phrase verification model and the trained statement verification model to determine an overall veracity of an input statement based on an input evidence set, wherein the trained phrase verification model is configured to generate initial veracity values for each phrase of the input statement based on the input evidence set, and wherein the trained statement verification model is configured to determine the overall veracity of the input statement based on the initial veracity values.

2. The method according to claim 1, wherein each of the plurality of local premises represents knowledge for verifying a veracity of the corresponding phrase.

3. The method according to claim 1, wherein the evidence phrase associated with one of the plurality of phrases represents a knowledge point for determining the veracity of the phrase.

4. The method according to claim 1, further comprising determining the evidence phrase associated with one of the plurality of phrases comprises:
generating a probing question associated with the phrase based on the statement; and
retrieving an answer to the probing question from the evidence set to serve as the evidence phrase.

5. The method according to claim 4, wherein generating the probing question comprises at least one of:
removing the phrase from the statement to take a cloze sentence associated with the statement as the probing question; and
taking an interrogative sentence for querying the phrase as the probing question based on a position of the phrase in the statement.

6. The method according to claim 4, wherein the label comprises any one of: "supported", "refuted", and "unverifiable", and wherein retrieving the answer comprises:
establishing a reading comprehension model, wherein the reading comprehension model enables the answer to be consistent with a real answer to the probing question;
acquiring another piece of training data comprising a statement, an evidence set, and a label; and
in response to a label of the other piece of training data being "supported", using the other piece of training data to train the reading comprehension model.

7. The method according to claim 2, further comprising:
establishing an objective function for jointly training the phrase verification model and the statement verification model, wherein the objective function enables a relationship between the statement veracity and the label to meet a predetermined condition; and
wherein training the phrase verification module and the statement verification module comprises: jointly training the phrase verification model and the statement verification model by using the objective function.

8. The method according to claim 7, further comprising:
acquiring a logical rule constraint between the plurality of phrase veracities and the statement veracity; and
updating the objective function based on the logical rule constraint, wherein the objective function enables a relationship between the plurality of phrase veracities and the statement veracity to meet the logical rule constraint.

9. The method according to claim 8, wherein establishing the objective function comprises:
determining a plurality of local codes respectively associated with the plurality of phrases based on the statement and a plurality of local premises;
determining a global code of the statement based on the statement and the evidence set; and
determining the objective function by using the label, the plurality of local codes, and the global code as parameters.

10. The method according to claim 9, wherein establishing the objective function further comprises:
determining a plurality of pieces of importance of the plurality of phrases respectively based on a comparison between the plurality of local premises and the statement;
determining a context code of the statement based on the plurality of pieces of importance and the plurality of local codes; and
determining the objective function by using the plurality of phrase veracities, the context code and the global code as parameters.

11. An electronic device, comprising:

at least one processing unit; and at least one memory, being coupled to the at least one processing unit and storing instructions for execution by the at least one processing unit, wherein the instructions, when executed by the at least one processing unit, cause the device to perform actions comprising:

acquiring training data comprising a statement, an evidence set, and a label, wherein the statement represents verified content, the evidence set comprises at least one piece of evidence for supporting verification of the veracity of the statement, and the label represents a result of verifying the veracity of the statement based on the evidence set;

dividing the statement into a plurality of phrases based on a grammatical analysis of the statement;

determining a plurality of local premises based on the evidence set, wherein each of the plurality of local premises corresponds to one of the plurality of phrases, and wherein each of the plurality of local premises comprises a modified version of the statement in which the corresponding one of the plurality of phrases has been replaced with an evidence phrase generated based on the evidence set;

training a phrase verification model based on the training data and the plurality of local premises, so that the phrase verification model determines a plurality of phrase veracities of the plurality of phrases respectively based on the evidence set;

training a statement verification model based on the training data and the plurality of local premises, so that the statement verification model determines a statement veracity of the statement based on the evidence set, wherein the plurality of phrase veracities provide an interpretation for the statement veracity; and applying the trained phrase verification model and the trained statement verification model to determine an overall veracity of an input statement based on an input evidence set, wherein the trained phrase verification model is configured to generate initial veracity values for each phrase of the input statement based on the input evidence set, and wherein the trained statement verification model is configured to determine the overall veracity of the input statement based on the initial veracity values.

12. The device according to claim 11, wherein each of the plurality of local premises represents knowledge for verifying a veracity of the corresponding phrase.

13. The device according to claim 11, wherein the evidence phrase associated with one of the plurality of phrases represents a knowledge point for determining the veracity of the phrase.

14. The device according to claim 13, wherein the instructions, when executed by the at least one processing unit, further cause the device to perform actions comprising:

generating a probing question associated with the phrase based on the statement; and retrieving an answer to the probing question from the evidence set to serve as the evidence phrase.

15. The device according to claim 14, wherein generating the probing question comprises at least one of:

removing the phrase from the statement to take a cloze sentence associated with the statement as the probing question; and taking an interrogative sentence for querying the phrase as the probing question based on a position of the phrase in the statement.

16. The device according to claim 14, wherein the label comprises any one of:

"supported", "refuted", and "unverifiable", and wherein retrieving the answer comprises:

establishing a reading comprehension model, wherein the reading comprehension model enables the answer to be consistent with a real answer to the probing question;

acquiring another piece of training data comprising a statement, an evidence set, and a label; and in response to a label of the other piece of training data being "supported", using the other piece of training data to train the reading comprehension model.

17. The device according to claim 12, further comprising:

establishing an objective function for jointly training the phrase verification model and the statement verification model, wherein the objective function enables a relationship between the statement veracity and the label to meet a predetermined condition; and wherein training the phrase verification module and the statement verification module comprises: jointly training the phrase verification model and the statement verification model by using the objective function.

18. The device according to claim 17, further comprising:

acquiring a logical rule constraint between the plurality of phrase veracities and the statement veracity; and updating the objective function based on the logical rule constraint, wherein the objective function enables a relationship between the plurality of phrase veracities and the statement veracity to meet the logical rule constraint.

19. The device according to claim 18, wherein establishing the objective function comprises:

determining a plurality of local codes respectively associated with the plurality of phrases based on the statement and a plurality of local premises;

determining a global code of the statement based on the statement and the evidence set; and determining the objective function by using the label, the plurality of local codes, and the global code as parameters.

20. A non-transitory computer-readable storage medium, having a computer program stored thereon, wherein the program, when executed by a processor, implements operations comprising:

acquiring training data comprising a statement, an evidence set, and a label, wherein the statement represents verified content, the evidence set comprises at least one piece of evidence for supporting verification of the veracity of the statement, and the label represents a result of verifying the veracity of the statement based on the evidence set;

dividing the statement into a plurality of phrases based on a grammatical analysis of the statement;

determining a plurality of local premises based on the evidence set, wherein each of the plurality of local premises corresponds to one of the plurality of phrases, and wherein each of the plurality of local premises comprises a modified version of the statement in which the corresponding one of the plurality of phrases has been replaced with an evidence phrase generated based on the evidence set;

training a phrase verification model based on the training data and the plurality of local premises, so that the phrase verification model determines a plurality of phrase veracities of the plurality of phrases respectively based on the evidence set;

training a statement verification model based on the training data and the plurality of local premises, so that the statement verification model determines a statement veracity of the statement based on the evidence set, wherein the plurality of phrase veracities provide an interpretation for the statement veracity; and applying the trained phrase verification model and the trained statement verification model to determine an overall veracity of an input statement based on an input evidence set, wherein the trained phrase verification model is configured to generate initial veracity values for each phrase of the input statement based on the input evidence set, and wherein the trained statement verification model is configured to determine the overall veracity of the input statement based on the initial veracity values.

\* \* \* \* \*